(12) United States Patent
Matsumoto et al.

(10) Patent No.: US 6,670,440 B2
(45) Date of Patent: Dec. 30, 2003

(54) PRODUCTION PROCESS AND PRODUCTION SYSTEM OF AROMATIC POLYCARBONATE

(75) Inventors: Kyosuke Matsumoto, Iwakuni (JP); Masasi Simonaru, Iwakuni (JP); Toru Sawaki, Iwakuni (JP); Katsushi Sasaki, Iwakuni (JP); Keiichi Kaneko, Iwakuni (JP)

(73) Assignee: Teijin Limited, Osaka (JP)

( * ) Notice: Subject to any disclaimer, the term of this patent is extended or adjusted under 35 U.S.C. 154(b) by 0 days.

(21) Appl. No.: 10/203,201

(22) PCT Filed: Dec. 5, 2001

(86) PCT No.: PCT/JP01/10640

§ 371 (c)(1),
(2), (4) Date: Aug. 7, 2002

(87) PCT Pub. No.: WO02/46271

PCT Pub. Date: Jun. 13, 2002

(65) Prior Publication Data

US 2003/0120023 A1 Jun. 26, 2003

(30) Foreign Application Priority Data

Dec. 7, 2000 (JP) ........................... 2000-372965
Dec. 18, 2000 (JP) ........................... 2000-383572
Feb. 2, 2001 (JP) ........................... 2001-27027

(51) Int. Cl.$^7$ ................................ C08G 64/00

(52) U.S. Cl. .................. 528/196; 264/176.1; 264/219; 264/330; 264/340; 264/331.18; 422/131; 528/198

(58) Field of Search ................ 528/196, 198; 422/131; 264/176.1, 219, 330, 340, 331.18

(56) References Cited

U.S. PATENT DOCUMENTS 5,952,449 A 9/1999 Aminaka et al.

FOREIGN PATENT DOCUMENTS

| JP | 7-268091 | 10/1995 |
|----|----------|---------|
| JP | 10-007783 | 1/1998 |
| JP | 10-226723 | 8/1998 |
| JP | 10-330473 | 12/1998 |
| JP | 2000-119388 | 4/2000 |
| JP | 2000-219732 | 8/2000 |
| JP | 2001-163968 | 6/2001 |
| JP | 2001-226478 | 8/2001 |

*Primary Examiner*—Terressa M. Boykin
(74) *Attorney, Agent, or Firm*—Sughrue Mion, PLLC

(57) ABSTRACT

There is provided a technique for producing an aromatic polycarbonate which undergoes no deterioration in quality in a gear pump, has excellent hue and contains a small amount of foreign materials even when a production plant is scaled up.

In producing the aromatic polycarbonate by melt-polycondensation, a molten polycondensate is fed continuously into a shaft seal portion of a self-lubricating gear pump disposed for transporting the polycondensate from a polycondensation vessel such that the following expressions:

$$Q/S \geq 0.1 \; (cm/sec)$$

wherein Q is a flow rate (cm$^3$/sec) of the polycondensate, and S is a cross sectional area (cm$^2$) of a passage provided for feeding the polycondensate to the shaft seal portion, and $$D \leq 2.9 W^{1/3}$$

wherein D is an internal diameter (cm) of a pipe, and W is a flow rate,
are satisfied, thereby operating the gear pump. A polycondensation vessel therefor is also disclosed.

20 Claims, 4 Drawing Sheets a cross sectional view at A-A' a cross sectional view at B-B' a cross sectional view at C-C'

US 6,670,440 B2

PRODUCTION PROCESS AND PRODUCTION SYSTEM OF AROMATIC POLYCARBONATE

TECHNICAL FIELD

The present invention relates to a production system and production process of an aromatic polycarbonate. More specifically, the present invention relates to a production process and production system which can produce an aromatic polycarbonate which exhibits excellent hue stability and thermostability at the time of production and is excellent in hue and transparency efficiently.

BACKGROUND ART

An aromatic polycarbonate resin has excellent properties including impact resistance and transparency. Therefore, it is widely used as a very useful resin. As a process of producing the aromatic polycarbonate resin, an interface process in which an aromatic dihydroxy compound is reacted with phosgene in a mixed solution of an organic solvent and an alkaline solution and a melt-polycondensation process in which an aromatic dihydroxy compound is reacted with a carbonic diester in the presence of a catalyst at a high temperature and under a reduced pressure and produced phenol is removed from the system can be used.

In the case of the melt-polycondensation process, a reaction mixture remaining molten at a high temperature moves between aromatic polycarbonate processing plants or is discharged from the aromatic polycarbonate processing plants.

While moving between the aromatic polycarbonate processing plants or being discharged from the aromatic polycarbonate processing plants, the molten reaction mixture is exposed to high temperatures, whereby it may become colored or foreign materials may be produced in the mixture. As a result, excellent properties such as transparency of an aromatic polycarbonate are impaired.

In particular, in the case of an aromatic polycarbonate intended for an optical application such as a compact disk, coloration and foreign materials are not preferable from the viewpoint of product quality.

Japanese Patent Laid-Open Publication No. 10-7783 discloses a process using a downstream pipe which has an average gradient of not lower than 1% and satisfies the following expression:

$$A/(A+B+C+D) > 0.9$$

wherein A is a length of a downstream pipe having a gradient of not lower than 1%, B is a length of a downstream pipe having a gradient of lower than 1%, C is a length of a horizontal pipe, and D is a length of an upstream pipe, as a pipe for transporting a molten polymer having a number average molecular weight of not smaller than 4,000 when polymerizing an aromatic dihydroxy compound and diaryl carbonate in a molten state by use of at least one polymerizer so as to produce an aromatic polycarbonate and a system for producing an aromatic polycarbonate which is characterized by use of a pipe as described above.

Japanese Patent Laid-Open Publication No. 10-226723 discloses a process for producing an aromatic polycarbonate by a melt-polycondensation process, wherein a transporting speed of a molten polymer is set at 0.05 m/sec or higher when the molten polymer has a number average molecular weight of smaller than 2,500 and at 0.005 m/sec or higher when the molten polymer has a number average molecular weight of not smaller than 2,500.

Japanese Patent Laid-Open Publication No. 10-330473 discloses a process for producing an aromatic polycarbonate by a melt-polycondensation process, wherein a pipe for transporting a molten polymer having a number average molecular weight of not smaller than 4,000 has 50 bends or less.

Japanese Patent Laid-Open Publication No. 2000-119388 discloses a process for producing an aromatic polycarbonate by a continuous melt-polycondensation process, wherein a flow rate of a reaction mixture in a pipe through which the molten reaction mixture passes is not lower than 0.5 cm/sec.

Japanese Patent Laid-Open Publication No. 2001-163968 discloses a process for producing an aromatic polycarbonate by a melt-polycondensation process, wherein a pipe for transporting a molten polymer having a viscosity average molecular weight of 4,000 to 30,000 has up to 40 flanges.

Further, Japanese Patent Laid-Open Publication No. 2001-226478 discloses a process for producing an aromatic polycarbonate having a viscosity average molecular weight of not smaller than 15,000 by a melt-polycondensation process, wherein a pipe for transporting a reaction solution having a viscosity average molecular weight of not smaller than 3,000 is a double-layer pipe comprising an inner pipe and an outer pipe with a heating medium therebetween, the reaction solution is caused to flow through the inner pipe of the pipe such that the following expression (1):

$$u \geq exp\{-0.21 \ln(\mu) - 3.8\} \tag{1}$$

wherein u is a pipe flow rate (m/s) which is a numerical value obtained by dividing a flow rate of the reaction solution by a cross section of the transport pipe, and $\mu$ is the reaction solution's viscosity (Pa·S) at an inlet of the transport pipe, is satisfied and average residence time is within 900 seconds, and a temperature of a heating medium in the outer pipe of the pipe is maintained at temperatures ranging from a temperature of the reaction solution in an upstream reactor connected to the pipe to the reaction solution temperature +50° C.

However, in all the above melt-polycondensation processes, specific considerations are not given to specific possible problems hindering a polycondensate transported in a pipe from flowing through the pipe.

DISCLOSURE OF THE INVENTION

It is an object of the present invention to provide a process for producing an aromatic polycarbonate which hardly undergoes coloration and production of foreign materials.

It is another object of the present invention to provide a process for producing such an aromatic polycarbonate of excellent quality as described above by controlling a flow of a reaction mixture which flows through a self-lubricating gear pump and a pipe having the gear pump and at least one of a bend, a valve and a detecting probe.

It is still another object of the present invention to provide a producion system suitable for performing the process of the present invention for producing such an aromatic polycarbonate as described above.

Other objects and advantages of the present invention will be apparent from the following description.

According to the present invention, firstly, the above objects and advantages of the present invention are achieved by a process for producing an aromatic polycarbonate by melt-polymerizing an aromatic dihydroxy compound and a carbonic acid diester in the presence of a catalyst continuously in multi steps in a plurality of polycondensation vessels connected to each other in series via pipes, wherein at least one of the pipes has a self-lubricating gear pump and reduced numbers of bends and locations of valves and detecting probes so that a total of flow inhibition strengths become 10 or less, and a polycondensate is fed into the at least one of the pipes such that the following expressions (1) and (2):

$$Q/S \geq 0.1 \quad (1)$$

wherein Q is a flow rate (cm³/sec) of a polycondensate to be continuously fed into a passage of a shaft seal portion of the self-lubricating gear pump, and S is a cross-sectional area (cm²) of the passage of the shaft seal portion of the self-lubricating gear pump, $$D \leq 2.9 \times W^{1/3} \quad (2)$$

wherein D is an internal diameter (cm) of the pipe, and W is a flow rate (cm³/sec) of the polycondensate, are satisfied simultaneously,
provided that flow inhibition strength corresponding to one bend or one location of the valve is 1 and flow inhibition strength corresponding to one location of the detecting probe is 0.5.

According to the present invention, secondly, the above objects and advantages of the present invention are achieved by a production system for producing an aromatic polycarbonate by melt-polycondensing an aromatic dihydroxy compound and a carbonic acid diester in the presence of a catalyst continuously, the system comprising:
a plurality of polycondensation vessels connected in series to each other,
an extrusion die connected to the lowest downstream polycondensation vessel via a polymer filter, and
pipes between all the polycondensation vessels and between the lowest downstream polycondensation vessel and the extrusion die,
wherein all the pipes except for one between first and second upstream polycondensation vessels have a self-lubricating gear pump and also have valves, bends and detecting probes such that a total of flow inhibition strengths become 10 or less, provided that flow inhibition strength per valve or bend is 1 and flow inhibition strength per detecting probe is 0.5.

Further, according to the present invention, thirdly, the above objects and advantages of the present invention are achieved by a production system for producing an aromatic polycarbonate by melt-polycondensing an aromatic dihydroxy compound and a carbonic acid diester in the presence of a catalyst continuously, the system comprising:
a plurality of polycondensation vessels connected in series to each other,
an extruder connected to the lowest downstream polycondensation vessel,
an extrusion die connected to the extruder via a polymer filter, and
pipes between all the polycondensation vessels, between the lowest downstream polycondensation vessel and the extruder and between the extruder and the extrusion die,
wherein all the pipes except for one between first and second upstream polycondensation vessels have a self-lubricating gear pump and also have valves, bends and detecting probes such that a total of flow inhibition strengths become 10 or less, provided that flow inhibition strength per valve or bend is 1 and flow inhibition strength per detecting probe is 0.5.

Further, according to the present invention, fourthly, the above objects and advantages of the present invention are achieved by a production system for producing an aromatic polycarbonate, the system comprising an extruder, an extrusion die, and a pipe connecting the extruder and the extrusion die with each other via a polymer filter, wherein the pipe has valves, bends and detecting probes such that a total of flow inhibition strengths become 10 or less, provided that flow inhibition strength per valve or bend is 1 and flow inhibition strength per detecting probe is 0.5.

PREFERRED EMBODIMENT OF THE INVENTION

Hereinafter, the present invention will be further described. First of all, description about the production process of the present invention will be given, followed by description about the production system of the present invention.

In the present invention, "polycondensate" refers to a mixture which initiates or promotes a polycondensation reaction in a step where an aromatic dihydroxy compound and a carbonic acid diester are melt-polycondensed in the presence of a catalyst, preferably an ester interchange catalyst comprising a nitrogen-containing basic compound and an alkali metal compound and/or an alkaline earth metal compound so as to obtain an aromatic polycarbonate. A polycondensate with a certain degree of polymerization is generally referred to as "prepolymer", and a polycondensate whose degree of polymerization is higher than that of the prepolymer is generally referred to as "polymer".

In the process of the present invention, melt-polycondensation is carried out in a plurality of polycondensation vessels connected in series to each other by means of pipes. In practice of the process of the present invention, as at least one of the pipes which connect the polycondensation vessels to each other, a pipe which has a self-lubricating gear pump and reduced numbers of bends and locations of valves and detecting probes so that a total of flow inhibition strengths become 10 or less is used.

Then, a polycondensate is fed into the at least one of the pipes with a shearing force adjusted such that the self-lubricating gear pump satisfies the above expression (1) and a polycondensate flowing through the pipe satisfies the above expression (2).

The self-lubricating gear pump has a passage of a shaft seal portion to which a polycondensate is fed continuously and has a mechanism that rotations of the gear pump are lubricated by the fed polycondensate. Then, the polycondensate fed to the passage of the shaft seal portion is discharged to the outside or put back to a polycondensate suction portion of the gear pump.

As the self-lubricating gear pump, one having excellent heat resistance and vacuum resistance is used.

As long as the above expression (1) is satisfied, even when the facility is scaled up, quality of a polycondensate hardly deteriorates in the gear pump and an aromatic polycarbonate having excellent hue and containing a small amount of foreign materials can be produced.

With reference to the attached FIGS. 1 to 4, a flow rate Q (cm$^3$/sec) of a polycondensate to be fed to the passage of the shaft seal portion of the self-lubricating gear pump used in the present invention and a cross-sectional area S (cm$^2$) of the passage will be further described.

Figure 1:
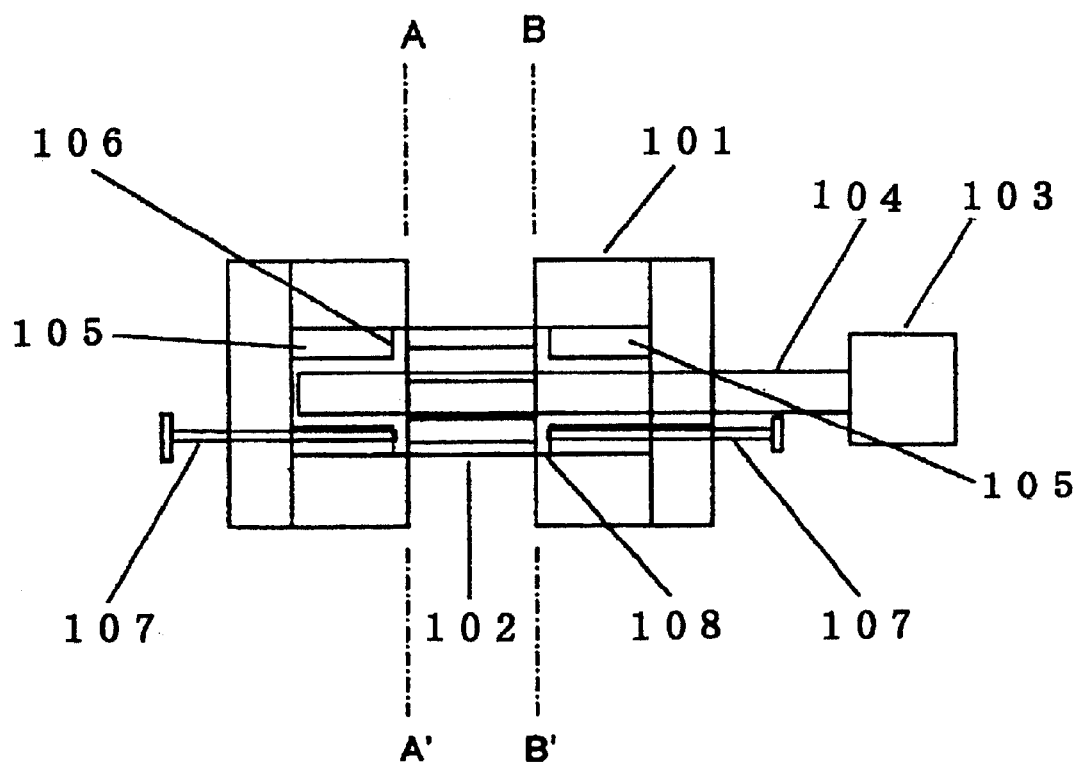
FIG. 1 is a front view of a self-lubricating gear pump used in the present invention.

In FIG. 1, a polycondensate is fed from an upper portion of a self-lubricating gear pump 101 and transported to a lower portion of the gear pump 101 by action of gears 102 of the gear pump 101. The gears 102 are driven by a motor 103. Driving shafts 104 of the gears 102 are supported by a bearing 105.

Figure 2:
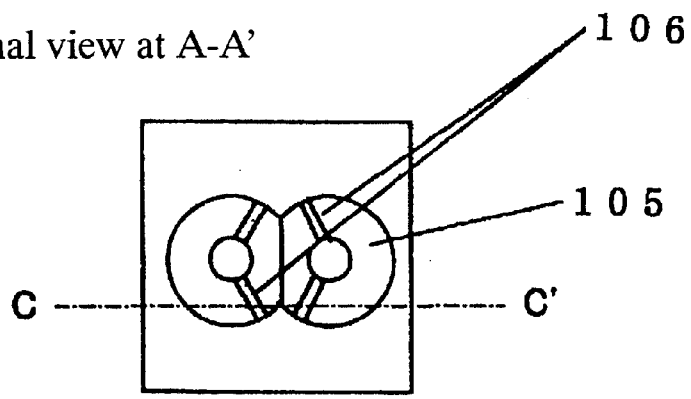
FIG. 2 is a cross sectional view at A–A' of FIG. 1.
Figure 3:
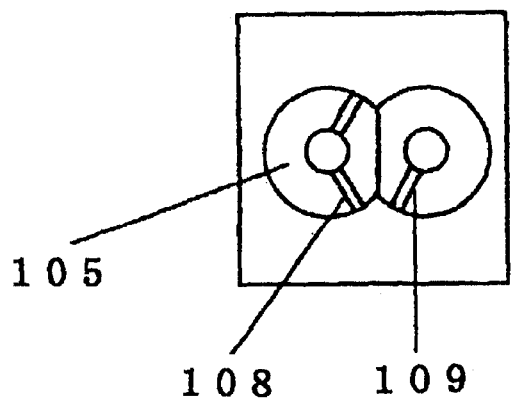
FIG. 3 is a cross sectional view at B–B' of FIG. 1.
Figure 4:
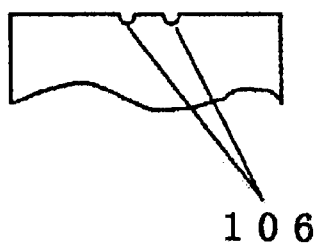
FIG. 4 is a cross sectional view at C–C' of FIG. 2.
Figure 5:
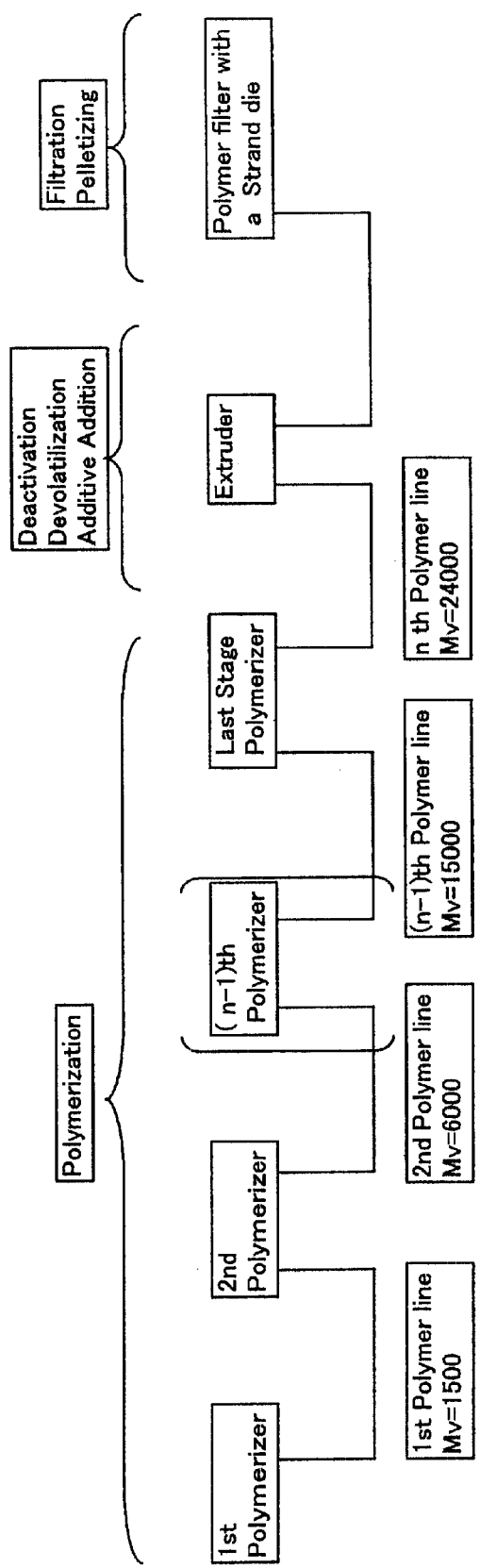
FIG. 5 is a diagram for illustrating a flow of a polycondensate by practice of the present invention.

A reaction mixture in a shaft seal portion on the opposite side of the motor passes through passages 106 so as to be put back to a suction portion of the gear pump. The bearing 105 is shown in FIG. 2 as well as in FIG. 1. Further, the cross-sectional area S is a cross-sectional area of the passage 6. The cross-sectional is shown in FIG. 4.

A flow rate through the passage 106 is the above Q and adjusted by pushing or pulling a flow rate adjusting bolt 107 in a direction parallel to the cross section of the passage 106.

The reason that there are two passages 106 is that there are two gears 102. The two passages 106 have a cross section of the same size.

In a case where there are a plurality of passages as described above, a relationship represented by the above expression (1) must hold for each of the passages.

A reaction mixture in a shaft seal portion on the motor side passes through a passage 108 so as to be put back to the suction portion of the gear pump, on a gear side where the shaft of the gear is not directly connected to the motor. Meanwhile, on a gear side where the shaft of the gear is directly connected to the motor, the reaction mixture passes through a passage 109 and then flows along the driving shaft so as to be discharged from the system. Cross sections of the passages 108 and 109 are the same as those shown in FIG. 4. Cross-sectional areas of the passages 108 and 109 are also represented by the above S. The passages 108 and 109 have a cross-sectional area of the same size. A ground shaft seal portion on the side where the shaft of the gear is directly connected to the motor has a complicated structure. Therefore, if the reaction mixture is to be put back to the suction portion of the gear pump, a decomposition product and the like may flow into the polycondensate from a residence portion of the portion having a complicated structure. The reason that the reaction mixture is discharged from the system in this case is to eliminate the possibility.

Flow rates through the passages 108 and 109 are also represented by the above Q and adjusted by pushing or pulling a flow rate adjusting bolt 107 in a direction parallel to the cross sections of the passages 108 and 109.

Further, to prevent deterioration in quality of a molten polycondensate flowing through a pipe as much as possible and produce an aromatic polycarbonate having excellent hue and containing a small amount of foreign materials, the above expression (2) must be satisfied.

To reduce residence of a polycondensate in a pipe, it is desirable to make a diameter of the pipe small and make a flow rate of the polycondensate in the pipe high. Further, to renew a boundary film of an internal wall of a pipe, it is desirable to make a shearing force of the internal wall of the pipe high. However, since an amount of a polycondensate flowing through a pipe increases along with an increase in production, a high pressure loss caused by the flow inevitably occurs when an excessively small pipe is used, thereby making it impossible to operate the production facility. Therefore, selection of an appropriate pipe diameter according to production is very important so as not to be influenced by a scale-up and so as to maintain good quality of a polycarbonate.

In the process for producing an aromatic polycarbonate according to the present invention, a pipe diameter and a flow rate of a polycondensate are provided by the above expression (2). In general, a polymer pipe diameter used in large-scale commercial production plants is preferably 650 mm or smaller, more preferably 300 mm or smaller.

A polycondensate in the production process of an aromatic polycarbonate according to the present invention is one which has a viscosity average molecular weight of preferably not smaller than 5,000. When the viscosity average molecular weight is smaller than the value, a less prominent effect is expected probably due to less occurrence of pseudo dead space.

As a pipe through which a polycondensate passes becomes shorter, the polycondensate undergoes less deterioration in quality in the pipe. As a result, an aromatic polycarbonate having excellent hue and containing a small amount of foreign materials can be produced. A total length of pipes through which the polycondensate passes is preferably not longer than 100 m, more preferably not longer than 30 m.

Further, to make a flow of a polycondensate in a pipe smooth, it is effective to increase a pressure of the polycondensate in the pipe. The pressure of the polycondensate in the pipe is preferably not lower than 0.01 MPa, more preferably not lower than 0.1 MPa. In addition, although an upper limit of the pressure of the polycondensate in the pipe is not particularly defined, a pressure of not higher than 50 MPa is generally used as the upper limit since an increase in pressure resistance of the pipe causes an increase in costs of plants.

In the present invention, in addition to the selection of an appropriate pipe diameter according to production as described above, it is necessary to control the numbers of locations of valves and detecting probes (such as those of viscosity and temperature detectors) and the number of bends in a pipe which may inhibit a flow of a polycondensate to appropriate numbers. In other words, these numbers must be controlled such that flow inhibition strength would be 10 or less, preferably 8 or less. It has been found that flow inhibition strength of a detecting probe corresponds to a half of flow inhibition strength of a bend or valve. With a flow inhibition strength of 10 or less, an effect of improving quality of an aromatic polycarbonate significantly can be achieved.

The above plurality of polycondensation vessels in which the process of the present invention is carried out are preferably 2 to 7 polycondensation vessels. Further, an extruder is more preferably provided after the lowest polycondensation vessel. In this extruder, at least one of deactivation of a catalyst, removal of a product having a low boiling point or addition of an additive can be performed.

In the above plurality of polycondensation vessels in which the process of the present invention is carried out, it is preferred that pipes between all the polymerizers and one from the lowest downstream polycondensation vessel except for one between the first and second upstream polycondensation vessels be the above pipe having a total of flow inhibition strengths of 10 or less and the pipe between the first and second upstream polycondensation vessels be a pipe having valves, bends and detecting probes such that a total of flow inhibition strengths would be 15 or less. Further, it is more preferred that the pipes between all the polycondensation vessels and the pipe from the lowest downstream polycondensation vessel have a total of flow inhibition strengths of 55 or less.

In addition, in the process of the present invention, polycondensates from all the polycondensation vessels except for the first upstream polycondensation vessel preferably have a viscosity average molecular weight of at least 5,000.

In attached FIG. 2, a flow of a polycondensate by the process of the present invention is described more specifically.

A polycondensate (for example, one having a viscosity average molecular weight $M_V$ of 1,500) produced in a first polycondensation vessel is transported to a second polycondensation vessel via a polymer pipe, and a polycondensate (for example, one having an $M_V$ of 6,000) produced in the second polycondensation vessel is transported to a subsequent polycondensation vessel via a polymer pipe. Similarly, polycondensation is repeated for (n−1) times as required. An (n−1)$^{th}$ polycondensate (for example, one having an $M_V$ of 15,000) is transported to a last polycondensation vessel so as to be polycondensed to a desired viscosity (for example, $M_V$ of 24,000) in the last polycondensation vessel. A polycondensate produced in the last polycondensation vessel is preferably transported to an extruder. In the extruder, the polycondensate undergoes deactivation of a catalyst, removal of volatile components or addition of additives and is filtered to remove contaminants therefrom, extruded into strands through a die and then pelletized.

A polycondensation reaction which forms a foundation of the present invention is a reaction in which an aromatic dihydroxy compound and a carbonic acid diester are melt-polycondensed in the presence of a catalyst, preferably an ester interchange catalyst comprising a nitrogen-containing basic compound and an alkali metal compound and/or an alkaline earth metal compound to produce an aromatic polycarbonate.

Illustrative examples of such an aromatic dihydroxy compound include bis(4-hydroxyphenyl)methane, 2,2-bis(4-hydroxyphenyl)propane, 2,2-bis(4-hydroxy-3-methylphenyl)propane, 4,4-bis(4-hydroxyphenyl)heptane, 2,2-bis(4-hydroxy-3,5-dichlorophenyl)propane, 2,2-bis(4-hydroxy-3,5-dibromophenyl)propane, bis(4-hydroxyphenyl)oxide, bis(3,5-dichloro-4-hydroxyphenyl)oxide, p,p'-dihydroxydiphenyl, 3,3'-dichloro-4,4'-dihydroxydiphenyl, bis(hydroxyphenyl)sulfone, resorcinol, hydroquinone, 1,4-dihydroxy-2,5-dichlorobenzene, 1,4-dihydroxy-3-methylbenzene, bis(4-hydroxyphenyl)sulfide, and bis(4-hydroxyphenyl)sulfoxide. Of these, 2,2-bis(4-hydroxyphenyl)propane is particularly preferred.

Illustrative examples of the carbonic acid diester include diphenyl carbonate, ditolyl carbonate, bis(chlorophenyl) carbonate, m-cresyl carbonate, dinaphthyl carbonate, bis(diphenyl)carbonate, dimethyl carbonate, diethyl carbonate, dibutyl carbonate and dicyclohexyl carbonate. Of these, diphenyl carbonate is particularly preferred.

A ratio between an aromatic dihydroxy compound used and a carbonic acid diester used is expressed as a value (molar ratio) obtained by dividing the number of moles of the carbonic acid diester used by the number of moles of the aromatic dihydroxy compound used and preferably selected from a range from 1.00 to 1.10.

Further, to produce an aromatic polycarbonate by the present invention, an aliphatic diol such as ethylene glycol, 1,4-butanediol, 1,4-cyclohexanedimethanol or 1,10-decanediol, a dicarboxylic acid such as succinic acid, isophthalic acid, 2,6-naphthalenedicarboxylic acid, adipic acid, cyclohexanecarboxylic acid or terephthalic acid, and a hydroxy acid such as lactic acid, p-hydroxybenzoic acid or 6-hydroxy-2-naphthoic acid may also be used as required.

A catalyst to be used is not particularly limited. An ester interchange catalyst comprising a nitrogen-containing basic compound and an alkali metal compound and/or an alkaline earth metal compound can be preferably used.

As the alkali metal and/or alkaline earth metal compound(s) to be used, a variety of known compounds can be used without particular limitations as long as they do not cause deterioration in hue of an aromatic polycarbonate to be obtained.

Illustrative examples of the alkali metal compound to be used as the catalyst include hydroxides, carbohydrides, carbonates, acetates, nitrates, nitrites, sulfites, cyanates, thiocyanates, stearates, borohydrides, benzoates, phosphohydrides, bisphenol salts and phenol salts of alkali metals.

Specific examples thereof include sodium hydroxide, potassium hydroxide, lithium hydroxide, sodium bicarbonate, potassium bicarbonate, lithium bicarbonate, sodium carbonate, potassium carbonate, lithium carbonate, sodium acetate, potassium acetate, lithium acetate, sodium nitrate, potassium nitrate, lithium nitrate, sodium nitrite, potassium nitrite, lithium nitrite, sodium sulfite, potassium sulfite, lithium sulfite, sodium cyanate, potassium cyanate, lithium cyanate, sodium thiocyanate, potassium thiocyanate, lithium thiocyanate, sodium stearate, potassium stearate, lithium stearate, sodium borohydride, potassium borohydride, lithium borohydride, sodium phenylborate, sodium benzoate, potassium benzoate, lithium benzoate, disodium hydrogen phosphate, dipotassium hydrogen phosphate, dilithium hydrogen phosphate, disodium salts, dipotassium salts and dilithium salts of bisphenol A, and sodium salts, potassium salts and lithium salts of phenol.

Illustrative examples of the alkaline earth metal compound to be used as the catalyst include hydroxides, carbohydrides, carbonates, acetates, nitrates, nitrites, sulfites, cyanates, thiocyanates, stearates, benzoates, bisphenol salts and phenol salts of alkaline earth metals.

Specific examples thereof include calcium hydroxide, barium hydroxide, strontium hydroxide, calcium bicarbonate, barium bicarbonate, strontium bicarbonate, calcium carbonate, barium carbonate, strontium carbonate, calcium acetate, barium acetate, strontium acetate, calcium nitrate, barium nitrate, strontium nitrate, calcium nitrite, barium nitrite, strontium nitrite, calcium sulfite, barium sulfite, strontium sulfite, calcium cyanate, barium cyanate, strontium cyanate, calcium thiocyanate, barium thiocyanate, strontium thiocyanate, calcium stearate, barium stearate, strontium stearate, calcium borohydride, barium borohydride, strontium borohydride, calcium benzoate, barium benzoate, strontium benzoate, calcium salts, barium salts and strontium salts of bisphenol A, and calcium salts, barium salts and strontium salts of phenol.

In the present invention, as desired, (a) an alkali metal salt of an ate complex of an element in a fourteenth group of the periodic table or (b) an alkali metal salt of an oxoacid of the element in the fourteenth group of the periodic table can be used as the alkali metal compound in the catalyst. The element in the fourteenth group of the periodic table is silicon, germanium or tin.

As the alkali metal salt (a) of the ate complex of the element in the fourteenth group of the periodic table, those described in Japanese Patent Laid-Open Publication No. 7-268091 are preferably used. Specific examples thereof include germanium (Ge) compounds such as NaGe(OMe)$_5$, NaGe(OEt)$_5$, NaGe(OPr)$_5$, NaGe(OBu)$_5$, NaGe(OPh)$_5$, LiGe(OMe)$_5$, LiGe(OBu)$_5$ and LiGe(OPh)$_5$.

Specific examples of Tin (Sn) compounds include NaSn(OMe)$_3$, NaSn(OMe)$_2$(OEt), NaSn(OPr)$_3$, NaSn(O-n-$C_6H_{13}$)$_3$, NaSn(OMe)$_5$, NaSn(OEt)$_5$, NaSn(OBu)$_5$, NaSn(O-n-$C_{12}H_{25}$)$_5$, NaSn(OEt)$_3$, NaSn(OPh)$_5$ and NaSnBu$_2$(OMe)$_3$.

Preferred examples of the alkali metal salt (b) of the oxoacid of the element in the fourteenth group of the periodic table include an alkali metal salt of silicic acid, an alkali metal salt of stanic acid, an alkali metal salt of germanous acid, and an alkali metal salt of germanic acid.

Illustrative examples of the alkali metal salt of silicic acid include acidic or neutral alkali metal salts of monosilicic acid or condensates thereof such as monosodium orthosilicate, disodium orthosilicate, trisodium orthosilicate and tetrasodium orthosilicate.

Illustrative examples of the alkali metal salt of stanic acid include acidic or neutral alkali metal salts of monostanic acid or condensates thereof such as disodium monostannate (Na$_2$SnO$_3$·XH$_2$O, X=0 to 5) and tetrasodium monostannate (Na$_2$SnO$_4$).

Illustrative examples of the alkali metal salt of germanous acid include acidic or neutral alkali metal salts of monogermanous acid or condensates thereof such as monosodium germanate (NaHGeO$_2$).

Illustrative examples of the alkali metal salt of germanic acid include acidic or neutral alkali metal salts of monogermanic acid or condensates thereof such as monolithium orthogermanate (LiH$_3$GeO$_4$), disodium orthogermanate, tetrasodium orthogermanate, disodium digermanate (Na$_2$Ge$_2$O$_5$), disodium tetragermanate (Na$_2$Ge$_4$O$_9$) and disodium pentagermanate (Na$_2$Ge$_5$O$_{11}$).

The alkali metal compound or alkaline earth metal compound as the catalyst is preferably used in such an amount that an amount of an alkali metal element or alkaline earth metal element in the catalyst is $1 \times 10^{-8}$ to $5 \times 10^{-5}$ equivalents, more preferably $5 \times 10^{-7}$ to $1 \times 10^{-5}$ equivalents, per mole of the aromatic dihydroxy compound.

When the amount of the alkali metal element or alkaline earth metal element in the catalyst exceeds the range of $1 \times 10^{-8}$ to $5 \times 10^{-5}$ equivalents permole of the aromatic dihydroxy compound, there arise such problems that physical properties of the aromatic polycarbonate to be obtained are adversely affected and that an ester interchange reaction does not fully proceed, thereby making it difficult to obtain an aromatic polycarbonate having a high molecular weight, disadvantageously.

Illustrative examples of the nitrogen-containing basic compound as the catalyst include ammonium hydroxides having an alkyl, aryl or alkylaryl group such as tetramethylammonium hydroxide (Me$_4$NOH), tetraethylammonium hydroxide (Et$_4$NOH), tetrabutylammonium hydroxide (BU$_4$NOH), benzyltrimethylammonium hydroxide ($\phi$-CH$_2$(Me)$_3$NOH) and hexadecyltrimethylammonium hydroxide, tertiary amines such as triethylamine, tributylamine, dimethylbenzylamine and hexadecyldimethylamine, and basic salts such as tetramethylammonium borohydride (Me$_4$NBH$_4$), tetrabutylammonium borohydride (Bu$_4$NBH$_4$), tetrabutylammonium tetraphenylborate (Me$_4$NBPh$_4$) and tetrabutylammonium tetraphenylborate (BU$_4$NBPh$_4$).

The above nitrogen-containing basic compound is preferably used in such an amount that an amount of ammonium nitrogen atoms in the nitrogen-containing basic compound is $1 \times 10^{-5}$ to $5 \times 10^{-3}$ equivalents, more preferably $2 \times 10^{-5}$ to $5 \times 10^{-4}$ equivalents, particularly preferably $5 \times 10^{-5}$ to $5 \times 10^{-4}$ equivalents, per mole of the aromatic dihydroxy compound.

In the present specification, the amounts of the alkali metal compound, alkaline earth metal compound and nitrogen-containing basic compound based on the aromatic dihydroxy compound to be charged are expressed as "amount of Z (name of compound) corresponding to W (numerical value) equivalents of metal or basic nitrogen per mole of the aromatic dihydroxy compound". This indicates that, for example, when Z is a compound having only one sodium atom such as sodium phenoxide or 2,2-bis(4-hydroxyphenyl)propane monosodium salt or a compound having only one basic nitrogen such as triethylamine, an amount of Z is an amount corresponding to W moles, while when Z is a compound having two sodium atoms such as 2,2-bis(4-hydroxyphenyl)propane disodium salt, the amount of Z is an amount corresponding to W/2 moles.

In the polycondensation reaction in the present invention, at least one co-catalyst selected from oxoacids and oxides of elements in the fourteenth group of the periodic table may coexist with the above catalyst as required.

Use of these co-catalysts in specific amounts can suppress undesirable side reactions such as a branching reaction which is liable to occur during the polycondensation reaction and production and burning of foreign materials in the system at the time of molding more effectively, without impairing speeds of a terminal blocking reaction and the polycondensation reaction.

Further, to the aromatic polycarbonate to be obtained in the present invention, a catalyst deactivating agent may also be added.

As the catalyst deactivating agent, known catalyst deactivating agents are used effectively. Of these, ammonium and phosphonium salts of a sulfonic acid are preferred, and a phosphonium salt of dodecylbenzenesulfonic acid such as tetrabutylphosphonium dodecylbenzenesulfonate and an ammonium salt of paratoluenesulfonic acid such as tetrabutylammonium paratoluenesulfonate are more preferred. Further, as sulfonates, methyl benzenesulfonate, ethyl benzenesulfonate, butyl benzenesulfonate, octyl benzenesulfonate, phenyl benzenesulfonate, methyl paratoluenesulfonate, ethyl paratoluenesulfonate, butyl paratoluenesulfonate, octyl paratoluenesulfonate and phenyl paratoluenesulfonate are preferably used. Of these, tetrabutylphosphonium dodecylbenzenesulfonate is the most preferably used.

These catalyst deactivating agents are used in an amount of preferably 0.5 to 50 moles, more preferably 0.5 to 10 moles, much more preferably 0.8 to 5 moles, per mole of the above polymerization catalyst selected from the alkali metal compound and/or the alkaline earth metal compound.

These catalyst deactivating agents are added to and mixed into a molten polycarbonate directly or after dissolved or dispersed in an appropriate solvent.

In addition, an additive may be added to the aromatic polycarbonate to be obtained in an amount that does not impair the objects of the present invention. As in the case of the catalyst deactivating agent, the additive is preferably added to a molten polycarbonate. Illustrative examples of such an additive include a thermostabilizer, an epoxy compound, an ultraviolet absorber, a mold releasing agent, a colorant, a slipping agent, an anti-blocking agent, a lubricant, an organic filler and an inorganic filler.

Of these, the thermostabilizer, ultraviolet absorber, mold releasing agent and colorant are particularly commonly used. These can be used in combination of two or more.

Illustrative examples of the thermostabilizer include a phosphorus compound, a phenolic stabilizer, an organic thioether stabilizer and a hindered amine stabilizer.

As the ultraviolet absorber, a known ultraviolet absorber is used. Illustrative examples of the ultraviolet absorber include a salicylic acid-based ultraviolet absorber, a benzophenone-based ultraviolet absorber, a benzotriazole-based ultraviolet absorber and a cyanoacrylate-based ultraviolet absorber.

Further, as the mold releasing agent, a known mold releasing agent can be used. Illustrative examples of the mold releasing agent include a hydrocarbon-based mold releasing agent such as a paraffin, a fatty-acid-based mold releasing agent such as stearic acid, a fatty-acid-amide-based mold releasing agent such as stearic acid amide, an alcohol-based mold releasing agent such as stearyl alcohol and pentaerythritol, a fatty-acid-ester-based mold releasing agent such as glycerol monostearate and pentaerythritol stearate, and a silicone-based mold releasing agent such as a silicone oil.

As the colorant, an organic or inorganic pigment or dye can be used.

A method for adding catalyst deactivating agents and additives as described above is not particularly limited. For example, they can be added to the polycarbonate directly. Further, in the case of the additives, they can be formed into master pellets and then added.

As described above, such addition is preferably made in the extruder such as a twin-screw extruder which is connected to the lowest downstream polycondensation vessel of the polycondensation vessels in which the process of the present invention is carried out.

Next, the production system of the present invention will be described.

The production system of the present invention is a system for carrying out the process of the present invention and, as described above, comprises:

a plurality of polycondensation vessels connected in series to each other, an extrusion die connected to the lowest downstream polycondensation vessel via a polymer filter, and pipes between all the polycondensation vessels and between the lowest downstream polycondensation vessel and the extrusion die, wherein all the pipes except for one between first and second upstream polycondensation vessels have a self-lubricating gear pump and also have valves, bends and detecting probes such that a total of flow inhibition strengths would be 10 or less (hereinafter may be referred to as "first production system").

Further, an embodiment incorporating an extruder comprises:

a plurality of polycondensation vessels connected in series to each other, an extruder connected to the lowest downstream polycondensation vessel, an extrusion die connected to the extruder via a polymer filter, and pipes between all the polycondensation vessels, between the lowest downstream polycondensation vessel and the extruder and between the extruder and the extrusion die, wherein all the pipes except for one between first and second upstream polycondensation vessels have a self-lubricating gear pump and also have valves, bends and detecting probes such that a total of flow inhibition strengths would be 10 or less (hereinafter may be referred to as "second production system").

Further, when the extruder is not connected to the polycondensation vessel, a system (hereinafter may be referred to as "third system") comprising an extruder, an extrusion die and a pipe which connects the extruder and the extrusion die with each other via a polymer filter, the pipe having valves, bends and detecting probes such that a total of flow inhibition strengths would be 10 or less, is used as a system for stabilizing an aromatic polycarbonate obtained by the process of the present invention by use of, for example, the first production system.

As described above, the first, second and third production systems of the present invention have pipes having valves, bends and detecting probes.

"Valves" include those which can allow a polycondensate to pass through or block a flow of the polycondensate and those for controlling a flowing amount or pressure of the polycondensate. Valves for introducing some materials into the system from outside and valves for discharging the polycondensate to outside are not included.

"Bends" refer to substantially bent portions of a pipe. A portion of the pipe can be said to be substantially bent if a curvature of the bent pipe portion is not more than 100 times as large as an internal diameter of the bent pipe portion.

"Detecting probes" refer to devices or mechanisms disposed in pipes through which a polycondensate flows for the purpose of detecting polymer properties of the polycondensate such as temperature, pressure or viscosity. The above detecting probes include those having functions of detecting various physical properties such as temperature, pressure and a flow rate.

The valves may cause dead space which causes residence of a polycondensate due to structures thereof and may cause deterioration in quality of the polycondensate in a pipe. Therefore, the number of valves to be disposed is important.

Further, at the pipe bends, a flow rate of the polycondensate may be extremely low. That is, pipe bends with low renewability of a boundary film of an internal wall of a pipe may cause residence of the polycondensate and cause deterioration in quality of the polycondensate in the pipe. Therefore, the number of bends in a pipe is important.

In addition, the detecting probes, as in the case of the valves, cause dead space which causes residence of a reaction mixture due to structures thereof. Therefore, the number of detecting probes to be disposed is important. However, as compared with the structure of the valve, the structure of the detecting probe is less likely to cause the dead space.

As for flow inhibition strengths of the pipes in the systems of the present invention except for the pipes between the first and second upstream polycondensation vessels in the first and second systems, flow inhibition strength per valve or bend is evaluated as 1 and flow inhibition strength per detecting probe is evaluated as 0.5, and each pipe has a total of counted flow inhibition strengths of 10 or less, preferably 7 or less, particularly preferably 3 or less, in view of the above flow inhibition factors of the valves, bends and detecting probes. Further, as a whole, a total of flow inhibition strengths of pipes each having a total of flow inhibition strengths of 10 or less in the system is preferably 55 or less.

In the first and second production systems of the present invention, the plurality of polycondensation vessels are preferably 2 to 7 polycondensation vessels.

In the plurality of polycondensation vessels, a total of lengths of the pipes excluding a length of the pipe between the first and second upstream polycondensation vessels is preferably not longer than 100 m.

Further, the pipe between the first and second upstream polycondensation vessels preferably has a self-lubricating gear pump and also has valves, bends and detecting probes such that a total of flow inhibition strengths would be 15 or less.

In the first and second production systems, a total of lengths of the above pipes having a total of flow inhibition strengths of 10 or less is more preferably not longer than 100 m.

A radius of curvature of a bend of the above pipe is preferably not less than five times, more preferably not less than 10 times, much more preferably not less than 20 times, as large as an internal diameter of the pipe.

Further, a total number of the above valves is preferably 30 or less, more preferably 20 or less, the most preferably 10 or less.

In addition, when a polymer pipe connecting adjacent polycondensation vessels or a polycondensation vessel and an extrusion die with each other is defined as one line, the number of polymer valves disposed in one line is preferably −10 or less, more preferably 7 or less, the most preferably 3 or less.

The above pipes may also be provided with flanges to connect the pipes with each other. Flow inhibition strength of a flange is much smaller than that of a bend or detecting probe. A total number of flanges in the system as a whole is preferably 100 or less, more preferably 60 or less, the most preferably 30 or less, when a pair of flanges needed for connection is counted as one flange. Further, the number of flanges provided in one line is preferably 25 or less, more preferably 15 or less, the most preferably 7 or less.

As the polymer filters in the first, second and third production systems, a leaf disk filter or a filter comprising a number of candle filters can be used, for example. Of these, the leaf disk filter having a large filtration area and excellent pressure resistance can be preferably used. The size of a sieve opening of a filter to be used is preferably changed according to viscosity of a polymer to be filtered. A sieve opening of 5 to 50 μm is generally used. As a material of the filter, a material which has heat resistance and is inert to a polymer is preferably used. Generally, a metal filter formed by pressurizing and sintering a nonwoven fabric obtained by forming metal fibers produced in accordance with SUS316 or SUS304 into paper by a wet or dry process is used.

The extrusion dies in the first, second and third production systems are a die for extruding a molten aromatic polycarbonate and are known per se. Further, the extruders in the second and third production systems have already been described with respect to the process of the present invention.

In addition, the self-lubricating gear pumps in the first and second production systems have also already been described with respect to the process of the present invention.

It should be understood that items which have not been described with respect to the systems but have already been described with respect to the process of the present invention are also applied to the systems.

EXAMPLES

The present invention will be described with reference to examples. The present invention, however, is not limited to the examples. Further, "%" and "parts" in the examples indicate "% by weight" and "parts by weight" unless otherwise stated. Physical properties of polycondensates and polycarbonates obtained in the examples were measured in the following manner.

Intrinsic Viscosity and Viscosity Average Molecular Weight:

An intrinsic viscosity [η] of 0.7 g/dl of methylene chloride solution was measured by use of an Ubbellohde viscometer, and a viscosity average molecular weight Mv was calculated from the following expression.

$$[\eta] = 1.23 \times 10^{-4} M v^{0.83}$$

Hue (b value):

L, a and b values of a polycarbonate pellet were measured by a reflection method by use of ND-1001DP manufactured by Nippon Denshoku Industries Co., Ltd. The b value was used as a scale for measuring a degree of yellow. Number of Foreign Materials:

After 1 kg of polycarbonate pellets were dissolved into 5 liters of methylene chloride, the resulting mixture was filtered by use of a filter having sieve openings of 30 μm, and foreign materials collected on the filter were counted.

Example 1

Melt polycondensation of an aromatic polycarbonate was carried out by use of the following reaction plants.

A melt polycondensation reaction was carried out continuously by use of a polymerizer having, as subsidiary plants, a raw material preparation vessel in which an aromatic dihydroxy compound and a carbonic acid diester which had been weighed and charged into the vessel could be molten under heating, a raw material feeding vessel which could receive a raw material prepared in the raw material preparation vessel and had a raw material pump capable of feeding a fixed amount of the raw material into a first initial polymerization vessel continuously, a catalyst preparation vessel into which a polymerization catalyst and phenol used for dissolving the catalyst could be weighed and then charged, and a catalyst feeding vessel which could receive a catalyst solution prepared in the catalyst preparation vessel and had a catalyst pump capable of feeding a fixed amount of the catalyst solution into the first initial polymerization vessel.

An initial polymerization vessel comprised the first initial polymerization vessel and a second initial polymerization vessel which were connected to each other in series. Each of the polymerization vessels was a vertical agitation vessel having an internal coil for heating.

These two initial polymerization vessels (first and second vessels) each had a rectifying column having a reflux mechanism for separating a monohydroxy compound produced by a reaction and a carbonic acid diester which was a raw material from each other.

A reaction mixture in the first vessel was continuously fed to the second vessel by means of a self-lubricating gear pump disposed within a pipe connecting the first vessel to the second vessel.

The pipe connecting the first vessel to the second vessel had one polymer valve as a valve, one temperature detecting probe, and one pressure detecting probe. The pipe had three bends.

The polymer pipe connecting the first vessel to the second vessel had an internal diameter of 12.7 mm, a radius of curvature of the bends of 150 mm, and a jacket for allowing the pipe to be heated and cooled from outside.

A reaction mixture in the second vessel was continuously fed to a late polymerization vessel by means of a self-lubricating gear pump disposed within a pipe connecting the second vessel to the late polymerization vessel.

The pipe connecting the second vessel to the late polymerization vessel had one polymer valve as a valve, one temperature detecting probe, one pressure detecting probe, and one viscosity detecting probe. The pipe had three bends.

As the pipe connecting the second vessel to the late polymerization vessel, one having an internal diameter of 12.7 mm, a radius of curvature of the bends of 150 mm and a jacket for allowing the pipe to be heated and cooled from outside was used.

A reaction mixture in the late polymerization vessel was continuously fed to a twin screw extruder by means of a self-lubricating gear pump disposed within a pipe connecting the late polymerization vessel with the twin screw extruder. The gear pump had such a structure that a reaction mixture to be introduced into a shaft seal portion on a motor side passed through a ground portion and was discharged from the pump and a reaction mixture to be introduced into a shaft seal portion on the opposite side of the motor was put back to a suction portion of the pump. Further, for the above purpose, cross-sectional areas S of passages for the reaction mixtures which was disposed in the gear pump were 0.035 cm².

The late polymerization vessel was a uniaxial horizontal agitation vessel which had no rectifying column and was fully covered with a jacket.

The pipe connecting the late polymerization vessel to the twin screw extruder had one polymer valve as a valve, one temperature detecting probe, one pressure detecting probe, and one viscosity detecting probe. The pipe had three bends.

The pipe connecting the late polymerization vessel to the twin screw extruder had an internal diameter of 12.7 mm, a radius of curvature of the bends of 150 mm, and a jacket for allowing the pipe to be heated and cooled from outside.

After having passed through the twin screw extruder, a reaction mixture was extruded from a die, cooled in a cooling bath to be a strand, and then cut into pellets with a cutter.

Operating conditions of the melt polycondensation were as follows.

Bisphenol A was used as the aromatic dihydroxy compound, and diphenyl carbonate was used as the carbonic acid diester. 500 Kg (2.33 Kmol) of molten diphenyl carbonate was charged into the raw material melting vessel and molten. Then, 527.6 kg (2.31 Kmol) of bisphenol A was charged into the vessel and molten under agitation. A raw material mixture thus prepared was transferred to the raw material feeding vessel.

As the polymerization catalyst, disodium salt of bisphenol A was used. The catalyst was dissolved into a mixed solution of phenol and water in a weight ratio of 90/10 in the catalyst preparation vessel so that the concentration of the catalyst would be 30 ppm. A catalyst solution thus prepared was transferred to the catalyst feeding vessel.

Flow rates of the raw material feeding pump and the catalyst solution feeding pump were controlled so that the amount of raw material to be fed to the first vessel would be 12.5 kg/hr and the amount of catalyst solution to be fed would be $1 \times 10^{-6}$ equivalents based on bisphenol A. Under the above conditions, continuous melt polycondensation was carried out.

Operating conditions of each polymerization vessel were as follows. Operating conditions for the first vessel comprised an internal temperature of 230° C. and a degree of vacuum of 100 Torr, those for the second vessel comprised an internal temperature of 260° C. and a degree of vacuum of 15 Torr, and those for the late polymerization vessel comprised a temperature of a heating medium in the external jacket of 270° C. and a degree of vacuum of 0.5 Torr. Further, the amounts of reaction mixtures extracted from the polymerization vessels were controlled so as to keep levels in the polymerization vessels constant. As a result, the amounts of reaction mixtures flowing through the polymer pipes connecting the polymerization vessels with each other were 8.3 L/hr from the first initial polymerization vessel to the second initial polymerization vessel, 6.8 L/hr from the second initial polymerization vessel to the late polymerization vessel, and 6.5 L/hr from the late polymerization vessel to the twin screw extruder. As a result, a value of $2.9 \times W^{1/3}$ of each polymer pipe was equivalent to 3.8 between the first initial polymerization vessel and the second initial polymerization vessel, 3.6 between the second initial polymerization vessel and the late polymerization vessel, and 3.5 between the late polymerization vessel and the twin screw extruder. Further, for the purpose of self-lubricating, a reaction mixture in an amount of 1.7 cm³/min per passage was passed through the self-lubricating gear pump used to extract the reaction mixture from the late polymerization vessel.

The above apparatuses were operated continuously under the above operating conditions for 600 hours, and reaction mixtures were sampled at outlets of the first vessel, the second vessel, the late polymerization vessel and the twin screw extruder upon passages of 200 hours, 400 hours and 600 hours.

The results of evaluations of reaction mixtures sampled upon passage of 200 hours are shown in Table 1, the results of evaluations of reaction mixtures sampled upon passage of 400 hours are shown in Table 2, and the results of evaluations of reaction mixtures sampled upon passage of 600 hours are shown in Table 3. In Table 4, the numbers of valves, bends and detecting probes and flow inhibition strength of each pipe are shown.

Example 2

The same apparatuses as those used in Example 1 were operated continuously under the same operating conditions as those used in Example 1 for 600 hours except that two late polymerization vessels were disposed in series, a pipe connecting the first late polymerization vessel to the second late polymerization vessel had one polymer valve as a valve, one temperature detecting probe and two pressure detecting probes, the pipe also had three bends, and the second late polymerization vessel was operated at a temperature of a heating medium in an external jacket of 290° C. and a degree of vacuum of 0.5 Torr. Further, the pipe connecting the first late polymerization vessel with the second late polymerization vessel had an internal diameter of 12.7 mm, a radius of curvature of the bends of 150 mm, and a jacket for allowing the pipe to be heated and cooled from outside.

Sampling was carried out at outlets of the first vessel, the second vessel, the first late polymerization vessel, the second late polymerization vessel and the twin screw extruder upon passages of 200 hours, 400 hours and 600 hours.

The results of evaluations of reaction mixtures sampled upon passage of 200 hours are shown in Table 1, the results of evaluations of reaction mixtures sampled upon passage of 400 hours are shown in Table 2, and the results of evaluations of reaction mixtures sampled upon passage of 600 hours are shown in Table 3.

Example 3

The same apparatuses as those used in Example 1 were operated continuously under the same operating conditions as those used in Example 1 for 600 hours except that the pipe connecting the first vessel to the second vessel had neither valves nor detecting probes but had five bends, the pipe connecting the second vessel to the late polymerization vessel had neither valves nor detecting probes but had five bends, and the pipe connecting the late polymerization vessel to the twin screw extruder had neither valves nor detecting probes but had five bends. Sampling was conducted at the outlets of the first vessel, the second vessel, the late polymerization vessel and the twin screw extruder upon passages of 200 hours, 400 hours and 600 hours.

The results of evaluations of reaction mixtures sampled upon passage of 200 hours are shown in Table 1, the results of evaluations of reaction mixtures sampled upon passage of 400 hours are shown in Table 2, and the results of evaluations of reaction mixtures sampled upon passage of 600 hours are shown in Table 3.

Comparative Example 1

The same apparatuses as those used in Example 1 were operated continuously under the same operating conditions as those used in Example 1 for 600 hours except that a pipe having two valves, six bends and a radius of curvature of the bends of 50 mm was used between the first vessel and the second vessel, a pipe having two valves, two temperature detecting probes, 15 bends and a radius of curvature of the bends of 50 mm was used between the second vessel and the late polymerization vessel, and a pipe having two valves, three pressure detecting probes, 16 bends and a radius of curvature of the bends of 50 mm was used between the late polymerization vessel and the twin screw extruder. Sampling was conducted at the outlets of the first vessel, the second vessel, the late polymerization vessel and the twin screw extruder upon passages of 200 hours, 400 hours and 600 hours.

The results of evaluations of reaction mixtures sampled upon passage of 200 hours are shown in Table 1, the results of evaluations of reaction mixtures sampled upon passage of 400 hours are shown in Table 2, and the results of evaluations of reaction mixtures sampled upon passage of 600 hours are shown in Table 3.

Comparative Example 2

The same apparatuses as those used in Example 2 were operated continuously under the same operating conditions as those used in Example 2 for 600 hours except that a pipe having two valves, 10 bends and a radius of curvature of the bends of 50 mm was used between the first vessel and the second vessel, a pipe having two valves, two temperature detecting probes, 10 bends and a radius of curvature of the bends of 50 mm was used between the second vessel and the first late polymerization vessel, a pipe having two valves, two temperature detecting probes, 16 bends and a radius of curvature of the bends of 50 mm was used between the first late polymerization vessel and the second late polymerization vessel, and a pipe having two temperature detecting probes, 16 bends and a radius of curvature of the bends of 50 mm was used between the second late polymerization vessel and the twin screw extruder. Flow rates were measured and sampling was conducted at the outlets of the first vessel, the second vessel, the first late polymerization vessel, the second late polymerization vessel and the twin screw extruder upon passages of 200 hours, 400 hours and 600 hours.

The results of evaluations of reaction mixtures sampled upon passage of 200 hours are shown in Table 1, the results of evaluations of reaction mixtures sampled upon passage of 400 hours are shown in Table 2, and the results of evaluations of reaction mixtures sampled upon passage of 600 hours are shown in Table 3.

Comparative Example 3

The same apparatuses as those used in Example 1 were operated continuously under the same operating conditions as those used in Example 1 for 600 hours except that a pipe connecting the first vessel to the second vessel had neither valves nor detecting probes but had eight bends, a pipe connecting the second vessel to the late polymerization vessel had neither valves nor detecting probes but had 13 bends, a pipe connecting the late polymerization vessel to the twin screw extruder had neither valves nor detecting probes but had 15 bends, and all these bends had a radius of curvature of 50 mm. Sampling was conducted at the outlets of the first vessel, the second vessel, the late polymerization vessel and the twin screw extruder upon passages of 200 hours, 400 hours and 600 hours.

The results of evaluations of reaction mixtures sampled upon passage of 200 hours are shown in Table 1, the results of evaluations of reaction mixtures sampled upon passage of 400 hours are shown in Table 2, and the results of evaluations of reaction mixtures sampled upon passage of 600 hours are shown in Table 3.

TABLE 1

Results of Evaluations of Reaction Mixtures Sampled upon Passage of 200 Hours

| No. | Site Where Reaction Mixture Was Sampled | Molecular Weight | L/a/b | Foreign *1 Material |
|---|---|---|---|---|
| Ex.1 | At Outlet of First Vessel | 1,500 | | |
| | At Outlet of Second Vessel | 5,500 | | |
| | At Outlet of Late Polymerization Vessel | 15,200 | | |
| | At Outlet of Twin Screw Extruder | 15,200 | 68/−1.3/−0.1 | 8 |
| Ex.2 | At Outlet of First Vessel | 1,600 | | |
| | At Outlet of Second Vessel | 5,600 | | |
| | At Outlet of First Late Polymerization Vessel | 15,300 | | |
| | At Outlet of Second Late Polymerization Vessel | 24,300 | | |
| | At Outlet of Twin Screw Extruder | 24,300 | 69/−1.2/0.8 | 10 |

TABLE 1-continued

Results of Evaluations of Reaction Mixtures Sampled upon Passage of 200 Hours

| No. | Site Where Reaction Mixture Was Sampled | Molecular Weight | L/a/b | Foreign *1 Material |
|---|---|---|---|---|
| Ex.3 | At Outlet of First Vessel | 1,500 | | |
| | At Outlet of Second Vessel | 5,600 | | |
| | At Outlet of Late Polymerization Vessel | 15,300 | | |
| | At Outlet of Twin Screw Extruder | 15,300 | 68/−1.3/0.1 | 12 |
| C.Ex.1 | At Outlet of First Vessel | 1,500 | | |
| | At Outlet of Second Vessel | 5,500 | | |
| | At Outlet of Late Polymerization Vessel | 15,200 | | |
| | At Outlet of Twin Screw Extruder | 15,200 | 67/−1.4/1.3 | 53 |
| C.Ex.2 | At Outlet of First Vessel | 1,600 | | |
| | At Outlet of Second Vessel | 5,600 | | |
| | At Outlet of First Late Polymerization Vessel | 15,300 | | |
| | At Outlet of Second Late Polymerization Vessel | 24,200 | | |
| | At Outlet of Twin Screw Extruder | 24,200 | 69/−1.3/2.0 | 100 or more |
| C.Ex.3 | At Outlet of First Vessel | 1,500 | | |
| | At Outlet of Second Vessel | 5,500 | | |
| | At Outlet of Late Polymerization Vessel | 15,200 | | |
| | At Outlet of Twin Screw Extruder | 15,200 | 67/−1.2/3.2 | 100 or more |

Ex.: Example
*1 unit: number per kg
C.Ex.: Comparative Example

TABLE 2

Results of Evaluations of Reaction Mixtures Sampled upon Passage of 400 Hours

| No. | Site Where Reaction Mixture Was Sampled | Molecular Weight | L/a/b | Foreign *1 Material |
|---|---|---|---|---|
| Ex.1 | At Outlet of First Vessel | 1,500 | | |
| | At Outlet of Second Vessel | 5,500 | | |
| | At Outlet of Late Polymerization Vessel | 15,200 | | |
| | At Outlet of Twin Screw Extruder | 15,200 | 68/−1.3/0.0 | 6 |
| Ex.2 | At Outlet of First Vessel | 1,600 | | |
| | At Outlet of Second Vessel | 5,600 | | |
| | At Outlet of First Late Polymerization Vessel | 15,300 | | |
| | At Outlet of Second Late Polymerization Vessel | 24,300 | | |
| | At Outlet of Twin Screw Extruder | 24,300 | 69/−1.2/0.8 | 9 |
| Ex.3 | At Outlet of First Vessel | 1,500 | | |
| | At Outlet of Second Vessel | 5,600 | | |
| | At Outlet of Late Polymerization Vessel | 15,300 | | |
| | At Outlet of Twin Screw Extruder | 15,300 | 68/−1.3/0.7 | 14 |
| C.Ex.1 | At Outlet of First Vessel | 1,500 | | |
| | At Outlet of Second Vessel | 5,500 | | |
| | At Outlet of Late Polymerization Vessel | 15,200 | | |
| | At Outlet of Twin Screw Extruder | 15,200 | 67/−1.5/1.5 | 47 |
| C.Ex.2 | At Outlet of First Vessel | 1,600 | | |
| | At Outlet of Second Vessel | 5,600 | | |
| | At Outlet of First Late Polymerization Vessel | 15,300 | | |
| | At Outlet of Second Late Polymerization Vessel | 24,200 | | |
| | At Outlet of Twin Screw Extruder | 24,200 | 69/−1.2/2.7 | 100 or more |
| C.Ex.3 | At Outlet of First Vessel | 1,500 | | |
| | At Outlet of Second Vessel | 5,500 | | |
| | At Outlet of Late Polymerization Vessel | 15,200 | | |
| | At Outlet of Twin Screw Extruder | 15,200 | 67/−1.3/3.4 | 100 or more |

Ex.: Example
*1 unit: number per kg
C.Ex.: Comparative Example

TABLE 3

Results of Evaluations of Reaction Mixtures Sampled upon Passage of 600 Hours

| No. | Site Where Reaction Mixture Was Sampled | Molecular Weight | L/a/b | Foreign *1 Material |
|---|---|---|---|---|
| Ex.1 | At Outlet of First Vessel | 1,500 | | |
| | At Outlet of Second Vessel | 5,500 | | |
| | At Outlet of Late Polymerization Vessel | 15,300 | | |
| | At Outlet of Twin Screw Extruder | 15,300 | 68/−1.3/−0.1 | 5 |

TABLE 3-continued

Results of Evaluations of Reaction Mixtures Sampled upon Passage of 600 Hours

| No. | Site Where Reaction Mixture Was Sampled | Molecular Weight | L/a/b | Foreign *1 Material |
|---|---|---|---|---|
| Ex.2 | At Outlet of First Vessel | 1,600 | | |
| | At Outlet of Second Vessel | 5,600 | | |
| | At Outlet of First Late Polymerization Vessel | 15,300 | | |
| | At Outlet of Second Late Polymerization Vessel | 24,300 | | |
| | At Outlet of Twin Screw Extruder | 24,300 | 69/−1.2/0.9 | 10 |
| Ex.3 | At Outlet of First Vessel | 1,500 | | |
| | At Outlet of Second Vessel | 5,600 | | |
| | At Outlet of Late Polymerization Vessel | 15,300 | | |
| | At Outlet of Twin Screw Extruder | 15,300 | 68/−1.3/0.6 | 13 |
| C.Ex.1 | At Outlet of First Vessel | 1,500 | | |
| | At Outlet of Second Vessel | 5,500 | | |
| | At Outlet of Late Polymerization Vessel | 15,200 | | |
| | At Outlet of Twin Screw Extruder | 15,200 | 67/−1.2/1.9 | 55 |
| C.Ex.2 | At Outlet of First Vessel | 1,600 | | |
| | At Outlet of Second Vessel | 5,600 | | |
| | At Outlet of First Late Polymerization Vessel | 15,300 | | |
| | At Outlet of Second Late Polymerization Vessel | 24,200 | | |
| | At Outlet of Twin Screw Extruder | 24,200 | 69/−1.4/2.8 | 100 or more |
| C.Ex.3 | At Outlet of First Vessel | 1,500 | | |
| | At Outlet of Second Vessel | 5,500 | | |
| | At Outlet of Late Polymerization Vessel | 15,200 | | |
| | At Outlet of Twin Screw Extruder | 15,200 | 67/−1.2/3.2 | 100 or more |

Ex.: Example
*1 unit: number per kg
C.Ex.: Comparative Example

TABLE 4

Numbers of Valves, Bends and Detecting Probes and Flow Inhibition strength

| No. | Site | Number of Valves | Number of Bends | Number of Detecting Probes | Flow Inhibition Strength |
|---|---|---|---|---|---|
| Ex.1 | Between First Vessel and Second Vessel | 1 | 3 | 2 | 5 |
| | Between Second Vessel and Late Polymerization Vessel | 1 | 3 | 3 | 5.5 |
| | Between Late Polymerization Vessel and Twin Screw Extruder | 1 | 3 | 3 | 5.5 |
| Ex.2 | Between First Vessel and Second Vessel | 1 | 3 | 2 | 5 |
| | Between Second Vessel and First Late Polymerization Vessel | 1 | 3 | 3 | 5.5 |
| | Between First Late Polymerization Vessel and Second Late Polymerization Vessel | 1 | 3 | 3 | 5.5 |
| | Between Second Late Polymerization Vessel and Twin Screw Extruder | 1 | 3 | 3 | 5.5 |
| Ex.3 | Between First Vessel and Second Vessel | 0 | 5 | 0 | 5 |
| | Between Second Vessel and Late Polymerization Vessel | 0 | 5 | 0 | 5 |
| | Between Late Polymerization Vessel and Twin Screw Extruder | 0 | 5 | 0 | 5 |
| C.Ex.1 | Between First Vessel and Second Vessel | 2 | 6 | 2 | 9 |
| | Between Second Vessel and Late Polymerization Vessel | 2 | 15 | 4 | 19 |
| | Between Late Polymerization Vessel and Twin Screw Extruder | 2 | 16 | 4 | 20 |
| C.Ex.2 | Between First Vessel and Second Vessel | 2 | 10 | 2 | 13 |
| | Between Second Vessel and First Late Polymerization Vessel | 2 | 10 | 4 | 14 |
| | Between First Late Polymerization Vessel and Second Late Polymerization Vessel | 2 | 16 | 4 | 20 |
| | Between Second Late Polymerization Vessel and Twin Screw Extruder | 1 | 16 | 4 | 19 |
| C.Ex.3 | Between First Vessel and Second Vessel | 0 | 8 | 0 | 8 |
| | Between Second Vessel and Late Polymerization Vessel | 0 | 13 | 0 | 13 |
| | Between Late Polymerization Vessel and Twin Screw Extruder | 0 | 15 | 0 | 15 |

Ex.: Example
C.Ex.: Comparative Example

Example 4

Figure 6:
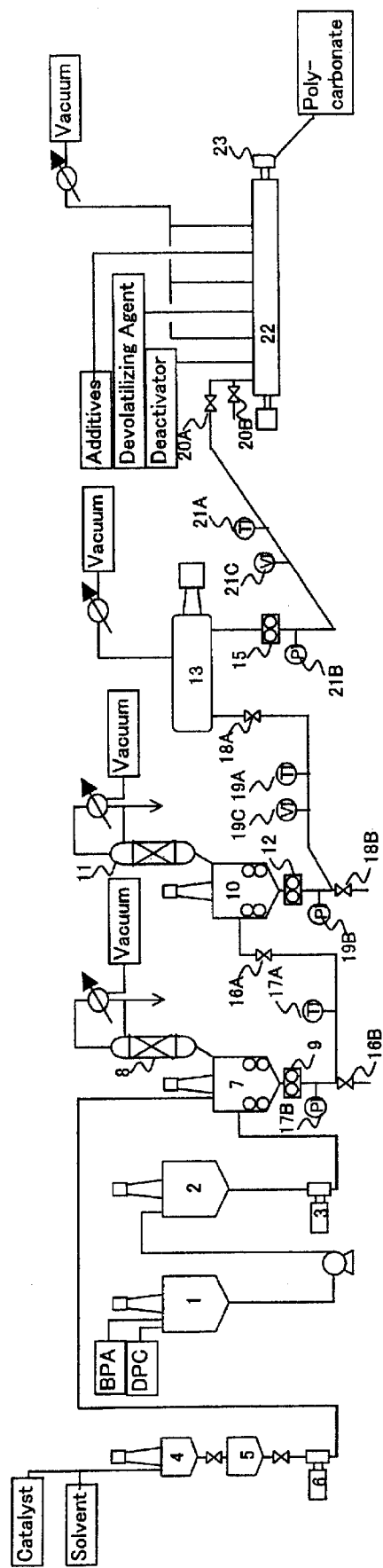
FIG. 6 is a diagram for illustrating a polycondensation vessel used in Examples.

Melt polycondensation of an aromatic polycarbonate was carried out by use of a reaction system as shown in FIG. 6.

A melt polycondensation reaction was carried out continuously by use of a polycondensation vessel having, as subsidiary plants, a raw material preparation vessel 1 in which an aromatic dihydroxy compound and a carbonic acid diester which had been weighed and charged into the vessel could be molten under heating, a raw material feeding vessel 2 which could receive a raw material prepared in the raw material preparation vessel and had a raw material pump 3 capable of feeding a fixed amount of the raw material into a first initial polymerization vessel 7 continuously, a catalyst preparation vessel 4 into which a polymerization catalyst and phenol used for dissolving the catalyst could be weighed and then charged, and a catalyst feeding vessel 5 which could receive a catalyst solution prepared in the catalyst preparation vessel and had a catalyst pump 6 capable of feeding a fixed amount of the catalyst solution into the first initial polymerization vessel 7.

An initial polymerization vessel comprised the first initial polymerization vessel 7 and a second initial polymerization vessel 10 which were connected to each other in series. Each of the vertical agitation vessels had an internal coil for heating.

These two initial polymerization vessels (first vessel 7 and second vessel 10) had rectifying columns 8 and 11 having a reflux mechanism for separating a monohydroxy compound produced by a reaction and a carbonic acid diester which was a raw material from each other.

A reaction mixture obtained in the first initial polymerization vessel was continuously fed to the second initial polymerization vessel by means of a self-lubricating gear pump 9 which was disposed within a pipe connecting the first initial polymerization vessel to the second initial polymerization vessel.

The pipe connecting the first initial polymerization vessel to the second initial polymerization vessel had a length of 8 m, excluding a length of the gear pump portion. The pipe also had a polymer valve 16A and a sampling valve 16B having a sampling nozzle as valves and a temperature detecting probe 17A and a pressure detecting probe 17B as detecting probes. Further, the pipe had three bends. In addition, the pipe also had a flange disposed at seven locations, i.e., at a connection between an outlet of the first initial polymerization vessel and the polymer pipe, at an inlet of the polymer valve disposed in the polymer pipe, at an outlet of the polymer valve, at the sampling valve provided between the polymer valve and the gear pump, at an inlet of the gear pump, at an outlet of the gear pump, and at a connection between an inlet of the second initial polymerization vessel and the pipe.

The polymer pipe connecting the first initial polymerization vessel to the second initial polymerization vessel had an internal diameter of 20 mm, a radius of curvature of the bends of 150 mm, and a jacket for allowing the pipe to be heated and cooled from outside.

A reaction mixture obtained in the second initial polymerization vessel was continuously fed to a late polymerization vessel by means of a self-lubricating gear pump 12 which was disposed in a pipe connecting the second initial polymerization vessel 10 to the late polymerization vessel 13.

The pipe connecting the second initial polymerization vessel to the late polymerization vessel had a length of 8 m, excluding a length of the gear pump portion. The pipe also had a polymer valve 18A and a sampling valve 18B having a sampling nozzle as valves and a temperature detecting probe 19A, a pressure detecting probe 19B and a viscosity detecting probe 19C as detecting probes. Further, the pipe had three bends. In addition, the pipe also had a flange disposed at seven locations, i.e., at a connection between an outlet of the second initial polymerization vessel and the polymer pipe, at an inlet of the polymer valve disposed in the polymer pipe, at an outlet of the polymer valve, at the sampling valve provided between the polymer valve and the gear pump, at an inlet of the gear pump, at an outlet of the gear pump, and at a connection between an inlet of the late polymerization vessel and the pipe.

The polymer pipe connecting the second initial polymerization vessel to the late polymerization vessel had an internal diameter of 20 mm, a radius of curvature of the bends of 150 mm, and a jacket for allowing the pipe to be heated and cooled from outside.

The late polymerization vessel was a uniaxial horizontal agitation vessel 13 which had no rectifying column and was fully covered with a jacket.

A reaction mixture obtained in the late polymerization vessel was continuously fed to a twin screw extruder by means of a self-lubricating gear pump 15 which was disposed within a pipe connecting the late polymerization vessel to the twin screw extruder 22.

The pipe connecting the late polymerization vessel to the twin screw extruder had a length of 8 m, excluding a length of the gear pump portion. The pipe also had a polymer valve 20A and a sampling valve 20B having a sampling nozzle as valves and a temperature detecting probe 21A, a pressure detecting probe 21B and a viscosity detecting probe 21C as detecting probes. Further, the pipe had three bends. In addition, the pipe also had a flange disposed at seven locations, i.e., at a connection between an outlet of the late polymerization vessel and the polymer pipe, at an inlet of the polymer valve disposed within the polymer pipe, at an outlet of the polymer valve, at the sampling valve provided between the polymer valve and the twin screw extruder, at an inlet of the gear pump, at an outlet of the gear pump, and at a connection between an inlet of the twin screw extruder and the pipe.

The polymer pipe connecting the late polymerization vessel to the twin screw extruder had an internal diameter of 20 mm, a radius of curvature of the bends of 150 mm, and a jacket for allowing the pipe to be heated and cooled from outside.

After passing through the twin screw extruder, a reaction mixture was extruded from a die 23, cooled in a cooling bath which was not shown in figures to be a strand, and then cut into pellets with a cutter which was not shown in figures.

Operating conditions of the melt polycondensation were as follows.

Bisphenol A was used as the aromatic dihydroxy compound, and diphenyl carbonate was used as the carbonic acid diester. 500 Kg (2.33 Kmol) of molten diphenyl carbonate was charged into the raw material melting vessel 1 and molten. Then, 527.6 kg (2.31 Kmol) of bisphenol A was charged and molten under agitation. A raw material mixture thus prepared was transferred to the raw material feeding vessel 2.

As the polymerization catalyst, disodium salt of bisphenol A was used. The catalyst was dissolved into a mixed solution of phenol and water in a weight ratio of 90/10 in the catalyst preparation vessel 4 so that the concentration of the catalyst would be 30 ppm. A catalyst solution thus prepared was transferred to the catalyst feeding vessel 5.

Flow rates of the raw material feeding pump 3 and the catalyst solution feeding pump 6 were controlled so that the amount of raw material to be fed to the first initial polymerization vessel 7 would be 12.5 kg/hr and the amount of catalyst solution to be fed would be $1 \times 10^{-6}$ equivalents based on bisphenol A. Under the above conditions, continuous melt polycondensation was carried out.

Operating conditions of each polymerization vessel were as follows. Operating conditions for the first initial polymerization vessel comprised an internal temperature of 230° C. and a degree of vacuum of 100 Torr, those for the second initial polymerization vessel comprised an internal temperature of 260° C. and a degree of vacuum of 15 Torr, and those for the late polymerization vessel comprised a temperature of a heating medium in the external jacket of 270° C. and a degree of vacuum of 0.5 Torr.

The above apparatuses were operated continuously under the above operating conditions for 600 hours, and flow rates of reaction mixtures were measured and sampling was conducted at outlets of the first initial polymerization vessel, the second initial polymerization vessel, the late polymerization vessel and the twin screw extruder upon passages of 200 hours, 400 hours and 600 hours.

The results of evaluations of reaction mixtures sampled upon passage of 200 hours are shown in Table 5, the results of evaluations of reaction mixtures sampled upon passage of 400 hours are shown in Table 6, and the results of evaluations of reaction mixtures sampled upon passage of 600 hours are shown in Table 7. Further, a viscosity average molecular weight, the average flow rate W (cm³/sec) and value of $2.9 \times W^{1/3}$ of a reaction mixture in each pipe, and internal diameter, internal pressure, length and numbers of polymer valves and flanges of each pipe in the present example are shown in Tables 5 to 8.

Example 5

Continuous melt polycondensation was carried out by use of a system having the same constitution as that in Example 4. To carry out the continuous melt polycondensation, flow rates of a raw material feeding pump and a catalyst solution feeding pump were adjusted such that amounts of raw material and catalyst solution to be fed into a first initial polymerization vessel would be fives times as much as those in Example 4. In this case, all pipes used had an internal diameter of 40 mm. Operating conditions of each polymerization vessel were adjusted such that a viscosity average molecular weight of a reaction mixture at an outlet of each polymerization vessel would be approximately the same as a corresponding viscosity average molecular weight in Example 4. The system was operated continuously for 600 hours, and flow rates of reaction mixtures were measured and sampling was conducted at outlets of the first initial polymerization vessel, second initial polymerization vessel, late polymerization vessel and twin screw extruder upon passages of 200 hours, 400 hours and 600 hours.

The results of evaluations of reaction mixtures sampled upon passage of 200 hours are shown in Table 5, the results of evaluations of reaction mixtures sampled upon passage of 400 hours are shown in Table 6, and the results of evaluations of reaction mixtures sampled upon passage of 600 hours are shown in Table 7. Further, a viscosity average molecular weight, the average flow rate W (cm³/sec) and value of $2.9 \times W^{1/3}$ of a reaction mixture in each pipe, and internal diameter, internal pressure, length and numbers of polymer valves and flanges of each pipe in the present example are shown in Tables 5 to 8.

As is understood from Tables 5, 6 and 7, even when the flow rates were scaled up nearly five times those in Example 4, the quality of a polycarbonate obtained was good as in the case of Example 4.

Example 6

The same reaction system as that used in Example 4 was operated continuously under the same operating conditions as those used in Example 4 for 600 hours except that the length of the pipe between the first initial polymerization vessel and the second initial polymerization vessel was changed from 8 m to 24 m, the diameter of the pipe between the second initial polymerization vessel and the late polymerization vessel was changed from 8 m to 24 m and the diameter of the pipe between the late polymerization vessel and the twin screw extruder was changed from 8 m to 24 m. Flow rates were measured and sampling was conducted at the outlets of the first initial polymerization vessel, the second initial polymerization vessel, the late polymerization vessel and the twin screw extruder upon passages of 200 hours, 400 hours and 600 hours.

The results of evaluations of reaction mixtures sampled upon passage of 200 hours are shown in Table 5, the results of evaluations of reaction mixtures sampled upon passage of 400 hours are shown in Table 6, and the results of evaluations of reaction mixtures sampled upon passage of 600 hours are shown in Table 7. Further, a viscosity average molecular weight, the average flow rate W (cm³/sec) and value of $2.9 \times W^{1/3}$ of a reaction mixture in each pipe, and internal diameter, internal pressure, length and numbers of polymer valves and flanges of each pipe in the present example are shown in Tables 5 to 8.

Comparative Example 4

The same reaction system as that used in Example 5 was operated continuously under the same operating conditions as those used in Example 5 for 600 hours except that the diameter of the pipe between the first initial polymerization vessel and the second initial polymerization vessel was changed from 40 mm to 200 mm, the diameter of the pipe between the second initial polymerization vessel and the late polymerization vessel was changed from 40 mm to 200 mm and the diameter of the pipe between the late polymerization vessel and the twin screw extruder was changed from 40 mm to 200 mm. Flow rates were measured and sampling was conducted at the outlets of the first initial polymerization vessel, the second initial polymerization vessel, the late polymerization vessel and the twin screw extruder upon passages of 200 hours, 400 hours and 600 hours.

The results of evaluations of reaction mixtures sampled upon passage of 200 hours are shown in Table 5, the results of evaluations of reaction mixtures sampled upon passage of 400 hours are shown in Table 6, and the results of evaluations of reaction mixtures sampled upon passage of 600 hours are shown in Table 7. Further, a viscosity average molecular weight, the average flow rate W (cm³/sec) and value of $2.9 \times W^{1/3}$ of a reaction mixture in each pipe, and internal diameter, internal pressure, length and numbers of polymer valves and flanges of each pipe in the present example are shown in Tables 5 to 8.

Comparative Example 5

The same reaction system as that used in Comparative Example 4 was operated continuously under the same operating conditions as those used in Example 5 for 600 hours except that the length of the pipe between the first initial polymerization vessel and the second initial polymerization vessel was changed from 8 m to 50 m, the length of the pipe between the second initial polymerization vessel and the late polymerization vessel was changed from 8 m to 50 m and the length of the pipe between the late polymerization vessel and the twin screw extruder was changed from 8 m to 50 m. Flow rates were measured and sampling was conducted at the outlets of the first initial polymerization vessel, the second initial polymerization vessel, the late polymerization vessel and the twin screw extruder upon passages of 200 hours, 400 hours and 600 hours.

The results of evaluations of reaction mixtures sampled upon passage of 200 hours are shown in Table 5, the results of evaluations of reaction mixtures sampled upon passage of 400 hours are shown in Table 6, and the results of evaluations of reaction mixtures sampled upon passage of 600 hours are shown in Table 7. Further, a viscosity average molecular weight, the average flow rate W (cm$^3$/sec) and value of $2.9 \times W^{1/3}$ of a reaction mixture in each pipe, and internal diameter, internal pressure, length and numbers of polymer valves and flanges of each pipe in the present example are shown in Tables 5 to 8.

Comparative Example 6

The same reaction system as that used in Comparative Example 4 was operated continuously under the same operating conditions as those used in Example 5 for 600 hours except that two late polymerization vessels were disposed in series, a pipe connecting the first initial polymerization vessel to the second initial polymerization vessel had 10 polymer valves and 20 flanges, a pipe connecting the second initial polymerization vessel to a first late polymerization vessel had 10 polymer valves and 20 flanges, a pipe connecting the first late polymerization vessel to a second late polymerization vessel had a length of 8 m and also had 10 polymer valves and 20 flanges, and a pipe connecting the second late polymerization vessel to the twin screw extruder had a length of 8 m and also had 10 polymer valves and 20 flanges. Flow rates were measured and sampling was conducted at the outlets of the first initial polymerization vessel, second initial polymerization vessel, second late polymerization vessel and twin screw extruder upon passages of 200 hours, 400 hours and 600 hours.

The results of evaluations of reaction mixtures sampled upon passage of 200 hours are shown in Table 5, the results of evaluations of reaction mixtures sampled upon passage of 400 hours are shown in Table 6, and the results of evaluations of reaction mixtures sampled upon passage of 600 hours are shown in Table 7. Further, a viscosity average molecular weight, the average flow rate W (cm$^3$/sec) and value of $2.9 \times W^{1/3}$ of a reaction mixture in each pipe, and internal diameter, internal pressure, length and numbers of polymer valves and flanges of each pipe in the present example are shown in Tables 5 to 8.

TABLE 5

Results of Evaluations of Reaction Mixtures Sampled upon Passage of 200 Hours

| No. | Site Where Reaction Mixture Was Sampled | Molecular Weight | L/a/b | Foreign *1 Material |
|---|---|---|---|---|
| Ex.4 | At Outlet of First Vessel | 1,500 | | |
| | At Outlet of Second Vessel | 5,500 | | |
| | At Outlet of Late Polymerization Vessel | 15,200 | 68/−1.3/0.2 | 8 |
| Ex.5 | At Outlet of First Vessel | 1,600 | | |
| | At Outlet of Second Vessel | 5,600 | | |
| | At Outlet of Late Polymerization Vessel | 15,300 | 68/−1.3/0.3 | 10 |
| Ex.6 | At Outlet of First Vessel | 1,700 | | |
| | At Outlet of Second Vessel | 5,600 | | |
| | At Outlet of Late Polymerization Vessel | 15,200 | 68/−1.6/0.2 | 13 |
| C.Ex.4 | At Outlet of First Vessel | 1,500 | | |
| | At Outlet of Second Vessel | 5,600 | | |
| | At Outlet of Late Polymerization Vessel | 15,300 | 68/−1.6/2.4 | 100 or more |
| C.Ex.5 | At Outlet of First Vessel | 1,600 | | |
| | At Outlet of Second Vessel | 5,600 | | |
| | At Outlet of Late Polymerization Vessel | 15,300 | 68/−1.6/1.9 | 100 or more |
| C.Ex.6 | At Outlet of First Vessel | 1,500 | | |
| | At Outlet of Second Vessel | 5,500 | | |
| | At Outlet of First Late Polymerization Vessel | 15,200 | | |
| | At Outlet of Second Late Polymerization Vessel | 24,200 | 67/−1.3/2.8 | 100 or more |

Ex.: Example
C.Ex.: Comparative Example
*1 unit: number per kg

TABLE 6

Results of Evaluations of Reaction Mixtures Sampled upon Passage of 400 Hours

| No. | Site Where Reaction Mixture Was Sampled | Molecular Weight | L/a/b | Foreign *1 Material |
|---|---|---|---|---|
| Ex.4 | At Outlet of First Vessel | 1,500 | | |
| | At Outlet of Second Vessel | 5,500 | | |
| | At Outlet of Late Polymerization Vessel | 15,200 | 68/−1.3/0.2 | 8 |

TABLE 6-continued

Results of Evaluations of Reaction Mixtures Sampled upon Passage of 400 Hours

| No. | Site Where Reaction Mixture Was Sampled | Molecular Weight | L/a/b | Foreign *1 Material |
|---|---|---|---|---|
| Ex.5 | At Outlet of First Vessel | 1,600 | | |
| | At Outlet of Second Vessel | 5,600 | | |
| | At Outlet of Late Polymerization Vessel | 15,300 | 68/−1.3/0.3 | 10 |
| Ex.6 | At Outlet of First Vessel | 1,700 | | |
| | At Outlet of Second Vessel | 5,600 | | |
| | At Outlet of Late Polymerization Vessel | 15,200 | 68/−1.6/0.2 | 11 |
| C.Ex.4 | At Outlet of First Vessel | 1,500 | | |
| | At Outlet of Second Vessel | 5,600 | | |
| | At Outlet of Late Polymerization Vessel | 15,300 | 68/−1.6/2.4 | 100 or more |
| C.Ex.5 | At Outlet of First Vessel | 1,600 | | |
| | At Outlet of Second Vessel | 5,600 | | |
| | At Outlet of Late Polymerization Vessel | 15,300 | 68/−1.6/1.9 | 100 or more |
| C.Ex.6 | At Outlet of First Vessel | 1,500 | | |
| | At Outlet of Second Vessel | 5,500 | | |
| | At Outlet of First Late Polymerization Vessel | 15,200 | | |
| | At Outlet of Second Late Polymerization Vessel | 24,300 | 68/−1.3/2.9 | 100 or more |

Ex.: Example
C.Ex.: Comparative Example
*1 unit: number per kg

TABLE 7

Results of Evaluations of Reaction Mixtures Sampled upon Passage of 600 Hours

| No. | Site Where Reaction Mixture Was Sampled | Molecular Weight | L/a/b | Foreign *1 Material |
|---|---|---|---|---|
| Ex.4 | At Outlet of First Vessel | 1,500 | | |
| | At Outlet of Second Vessel | 5,500 | | |
| | At Outlet of Late Polymerization Vessel | 15,200 | 68/−1.3/0.2 | 9 |
| Ex.5 | At Outlet of First Vessel | 1,600 | | |
| | At Outlet of Second Vessel | 5,600 | | |
| | At Outlet of Late Polymerization Vessel | 15,300 | 68/−1.3/0.3 | 10 |
| Ex.6 | At Outlet of First Vessel | 1,700 | | |
| | At Outlet of Second Vessel | 5,600 | | |
| | At Outlet of Late Polymerization Vessel | 15,200 | 68/−1.6/0.2 | 12 |
| C.Ex.4 | At Outlet of First Vessel | 1,500 | | |
| | At Outlet of Second Vessel | 5,600 | | |
| | At Outlet of Late Polymerization Vessel | 15,300 | 68/−1.6/2.4 | 100 or more |
| C.Ex.5 | At Outlet of First Vessel | 1,600 | | |
| | At Outlet of Second Vessel | 5,600 | | |
| | At Outlet of Late Polymerization Vessel | 15,300 | 68/−1.6/1.9 | 100 or more |
| C.Ex.6 | At Outlet of First Vessel | 1,500 | | |
| | At Outlet of Second Vessel | 5,500 | | |
| | At Outlet of Late Polymerization Vessel | 15,200 | | |
| | At Outlet of Second Late Polymerization Vessel | 24,200 | 68/−1.3/2.1 | 100 or more |

Ex.: Example
C.Ex.: Comparative Example
*1 unit: number per kg

TABLE 8

Flow Rate, Internal Pressure, Length and Numbers of Polymer Valves and Flanges of Pipe

| No. | Site | Flow Rate *1 | $2.9 \times$ (Flow Rate W)$^{1/3}$ *2 | Internal Diameter D of Pipe (cm) | Internal Pressure of Piping *3 | Length of Pipe (m) | Number of Polymer Valves | Number of Flanges |
|---|---|---|---|---|---|---|---|---|
| Ex.4 | Between First Vessel and Second Vessel | 2.3 | 3.8 | 2 | 0.02 | 8 | 1 | 7 |
| | Between Second Vessel and Late Polymerization Vessel | 1.9 | 3.6 | 2 | 0.3 | 8 | 1 | 7 |
| | Between Late Polymerization Vessel and Twin Screw Extruder | 1.8 | 3.5 | 2 | 2.5 | 8 | 1 | 5 |
| Ex.5 | Between First Vessel and Second Vessel | 11.3 | 6.5 | 4 | 0.02 | 8 | 1 | 7 |
| | Between Second Vessel and Late Polymerization Vessel | 9.3 | 6.1 | 4 | 0.3 | 8 | 1 | 7 |

TABLE 8-continued

Flow Rate, Internal Pressure, Length and Numbers of Polymer Valves and Flanges of Pipe

| No. | Site | Flow Rate *1 | 2.9 × (Flow Rate W)$^{1/3}$ *2 | Internal Diameter D of Pipe (cm) | Internal Pressure of Piping *3 | Length of Pipe (m) | Number of Polymer Valves | Number of Flanges |
|---|---|---|---|---|---|---|---|---|
| | Between Late Polymerization Vessel and Twin Screw Extruder | 9.0 | 6.0 | 4 | 2.6 | 8 | 1 | 5 |
| Ex.6 | Between First Vessel and Second Vessel | 2.3 | 3.8 | 2 | 0.02 | 24 | 1 | 7 |
| | Between Second Vessel and Late Polymerization Vessel | 1.9 | 3.6 | 2 | 0.3 | 24 | 1 | 7 |
| | Between Late Polymerization Vessel and Twin Screw Extruder | 1.8 | 3.5 | 2 | 2.6 | 24 | 1 | 5 |
| C.Ex.4 | Between First Vessel and Second Vessel | 11.3 | 6.5 | 20 | 0.07 | 8 | 1 | 7 |
| | Between Second Vessel and Late Polymerization Vessel | 9.3 | 6.1 | 20 | 0.8 | 8 | 1 | 7 |
| | Between Late Polymerization Vessel and Twin Screw Extruder | 9.0 | 6.0 | 20 | 4.9 | 8 | 1 | 5 |
| C.Ex.5 | Between First Vessel and Second Vessel | 11.3 | 6.5 | 20 | 0.08 | 50 | 1 | 7 |
| | Between Second Vessel and Late Polymerization Vessel | 9.3 | 6.1 | 20 | 0.9 | 50 | 1 | 7 |
| | Between Late Polymerization Vessel and Twin Screw Extruder | 9.0 | 6.0 | 20 | 4.9 | 50 | 1 | 5 |
| C.Ex.6 | Between First Vessel and Second Vessel | 11.3 | 6.5 | 20 | 0.02 | 8 | 10 | 20 |
| | Between Second Vessel and First Late Polymerization Vessel | 9.3 | 6.1 | 20 | 0.3 | 8 | 10 | 20 |
| | Between First Late Polymerization Vessel and Second Late Polymerization Vessel | 9.0 | 6.0 | 20 | 2.5 | 8 | 10 | 20 |
| | Between Second Late Polymerization Vessel and Twin Screw Extruder | 9.0 | 6.0 | 20 | 3.5 | 8 | 10 | 20 |

Ex.: Example
*1 unit: cm$^3$/sec,
*2 unit: sec$^{-1}$,
3* unit: MPa
C.Ex.: Comparative Example

Example 7

Melt polycondensation of an aromatic polycarbonate was carried out by use of the continuous polymerization system as shown in FIG. 6 which was used in Example 4. The self-lubricating gear pump 15 used for extracting a reaction mixture produced in the late polymerization vessel 13 had the following specification. The gear pump had such a structure that a reaction mixture to be introduced into a shaft seal portion on a motor side passed through a ground portion and was discharged from the pump and a reaction mixture to be introduced into a shaft seal portion on the opposite side of the motor was put back to a suction portion of the pump. Further, a cross-sectional area S of a passage for the reaction mixture to be introduced into the shaft seal portion on the motor side was 0.035 cm$^2$. An amount Q of the reaction mixture to be discharged from the pump was 1.7 cm$^3$/min. Thereby, Q/S was determined to be 0.8 cm/sec. Meanwhile, a cross-sectional area S of a passage for the reaction mixture to be introduced into the shaft seal portion on the opposite side of the motor was 0.035 cm$^2$. An amount Q of the reaction mixture flowing toward the shaft seal portion was 1.7 cm$^3$/min. Thereby, Q/S was determined to be 0.8 cm/sec.

The above Q and S correspond to each passage.

Operating conditions of the melt polycondensation were as follows.

Bisphenol A was used as an aromatic dihydroxy compound, and diphenyl carbonate was used as a carbonic acid diester. 500 Kg (2.33 Kmol) of molten diphenyl carbonate was charged into the raw material melting vessel 1 and molten. Then, 527.6 kg (2.31 Kmol) of bisphenol A was charged into the vessel so that the molar ratio of diphenyl carbonate and bisphenol A would be 1.01:1, and molten under agitation. A raw material mixture thus prepared was transferred to the raw material feeding vessel 2.

As a polymerization catalyst, disodium salt of bisphenol A was used. The catalyst was dissolved into a mixed solution of phenol and water in a weight ratio of 90/10 in the catalyst preparation vessel 4 so that the concentration of the catalyst would be 30 ppm. A catalyst solution thus prepared was transferred to the catalyst feeding vessel 5.

Flow rates of the raw material feeding pump 3 and the catalyst solution feeding pump 6 were controlled so that an amount of raw material to be fed to the first initial polymerization vessel 7 would be 12.5 kg/hr and an amount of catalyst solution to be fed would be 1×10$^{-6}$ equivalents based on bisphenol A. Continuous melt polycondensation was carried out with a viscosity average molecular weight at an outlet of the second initial polymerization vessel 10 of 6,000 and a viscosity average molecular weight at an outlet of the late polymerization vessel 13 of 15,000.

The above apparatuses were operated continuously under the above operating conditions for 600 hours, and a reaction mixture was sampled at the outlet of the late polymerization vessel upon passages of 200 hours, 400 hours and 600 hours.

The results of evaluations of the sampled reaction mixtures are shown in Table 9.

Example 8

Continuous melt polycondensation was carried out by use of the same system as that used in Example 7. To carry out the continuous melt polycondensation, flow rates of the raw material feeding pump and the catalyst solution feeding pump were adjusted such that amounts of raw material and catalyst solution to be fed would be fives times as much as those in Example 7. Values of Q and S were the same as those in Example 7. The system was operated continuously for 600 hours with viscosity average molecular weights measured at the outlets of the polymerization vessels kept at the same levels as those in Example 7, and a reaction mixture was sampled at the outlet of the late polymerization vessel upon passages of 200 hours, 400 hours and 600 hours.

The results of evaluations of the sampled reaction mixtures are shown in Table 9.

Even if the flow rates were scaled up nearly five times those in Example 7, the quality of a polycarbonate obtained was good as in the case of Example 7.

Comparative Example 7

The system used in Example 8 was operated continuously under the same operating conditions as those used in Example 8 for 600 hours except that a volt (shown in FIGS. 1 to 4) was screwed into a passage for introducing a reaction mixture to a shaft seal portion of a gear pump disposed at the outlet of the late polymerization vessel so as to narrow the passage locally, thereby changing an amount Q of reaction mixture to be discharged from the pump and an amount of reaction mixture to be fed into a shaft seal portion on the opposite side of the motor to 0.025 cm³/min.

A cross-sectional area of the passage portion narrowed by the volt was 0.0053 cm², and a cross-sectional area of the passage other than the narrowed portion was 0.035 cm². Therefore, Q/S of the narrowed portion was determined to be 0.08 cm/sec, and Q/S of the passage portion other than the narrowed portion was determined to be 0.01 cm/sec.

A reaction mixture was sampled at the outlet of the late polymerization vessel upon passage of 200 hours, 400 hours and 600 hours from the start of the continuous operation.

The results of evaluations of the sampled reaction mixtures are shown in Table 9.

Comparative Example 8

The same system as that used in Example 8 was operated continuously under the same operating conditions as those used in Example 8 for 600 hours except that a volt (shown in FIGS. 1 to 4) was screwed in to narrow the passage locally as in the case of Comparative Example 7, thereby changing an amount Q of reaction mixture to be discharged from the pump and an amount of reaction mixture to be fed into the shaft seal portion on the opposite side of the motor to 0.17 cm³/min.

A cross-sectional area of the passage portion narrowed by the volt was 0.013 cm², and a cross-sectional area of the passage other than the narrowed portion was 0.035 cm². Therefore, Q/S of the narrowed portion was determined to be 0.22 cm/sec, and Q/S of the passage portion other than the narrowed portion was determined to be 0.08 cm/sec.

A reaction mixture was sampled at the outlet of the late polymerization vessel upon passage of 200 hours, 400 hours and 600 hours from the start of the continuous operation.

The results of evaluations of the sampled reaction mixtures are shown in Table 9.

TABLE 9

Results of Evaluations of Sampled Reaction Mixtures

| No. | Operation Hours | Molecular Weight | L/a/b | Foreign Material *1 |
|---|---|---|---|---|
| Ex.7 | 200 hours | 15,200 | 68/−1.3/0.2 | 8 |
|  | 400 hours | 15,200 | 68/−1.3/0.2 | 8 |
|  | 600 hours | 15,200 | 68/−1.3/0.2 | 9 |
| Ex.8 | 200 hours | 15,300 | 68/−1.3/0.3 | 10 |
|  | 400 hours | 15,300 | 68/−1.3/0.3 | 10 |
|  | 600 hours | 15,300 | 68/−1.3/0.3 | 10 |
| C.Ex.7 | 200 hours | 15,200 | 68/−1.6/1.8 | 100 or more (110) |
|  | 400 hours | 15,200 | 68/−1.6/2.4 | 100 or more (180) |
|  | 600 hours | 15,200 | 68/−1.6/2.8 | 100 or more (210) |
| C.Ex.8 | 200 hours | 15,200 | 68/−1.6/0.6 | 50 |
|  | 400 hours | 15,200 | 68/−1.6/1.2 | 70 |
|  | 600 hours | 15,200 | 68/−1.6/1.6 | 80 |

Ex.: Example
C.Ex.: Comparative Example
*1 unit: number per kg

What is claimed is:

1. A process for producing an aromatic polycarbonate by melt-polycondensing an aromatic dihydroxy compound and a carbonic acid diester in the presence of a catalyst continuously in multi-steps in a plurality of polycondensation vessels connected to each other in series via pipes, wherein at least one of the pipes has a self-lubricating gear pump and reduced numbers of bends and locations of valves and detecting probes so that a total of flow inhibition strengths become 10 or less, and a polycondensate is fed into the at least one of the pipes such that the following expressions (1) and (2):

$$Q/S \geq 0.1 \tag{1}$$

wherein Q is a flow rate (cm³/sec) of a polycondensate to be continuously fed into a passage of a shaft seal portion of the self-lubricating gear pump, and s is a cross-sectional area (cm²) of the passage of the shaft seal portion of the self-lubricating gear pump, $$D \leq 2.9 \times W^{1/3} \tag{2}$$

wherein D is an internal diameter (cm) of the pipe, and w is a flow rate (cm³/sec) of the polycondensate, are satisfied simultaneously,
provided that flow inhibition strength corresponding to one bend or one location of the valve is 1 and flow inhibition strength corresponding to one location of the detecting probe is 0.5.

2. The process of claim 1, wherein a viscosity average molecular weight of the polycondensate is at least 5,000.

3. The process of claim 2, wherein the polycondensate is a polycondensate from a polycondensation vessel other than a first upstream polycondensation vessel.

4. The process of claim 1, wherein the plurality of polycondensation vessels are 2 to 7 polycondensation vessels.

5. The process of claim 4, wherein pipes between all the polycondensation vessels and a pipe from the lowest downstream polycondensation vessel except for a pipe between the first and second upstream polycondensation vessels are the pipe having a total of flow inhibition strength of 10 or less and the pipe between the first and second upstream polycondensation vessels is a pipe having valves, bends and detecting probes such that a total of flow inhibition strengths become 15 or less.

6. The process of claim 1, wherein the pipes between all the polycondensation vessels and the pipe from the lowest downstream polycondensation vessel have a total of flow inhibition strengths of 55 or less.

7. The process of claim 1, wherein the plurality of polycondensation vessels have an extruder connected to the lowest downstream polycondensation vessel via a pipe having a total of flow inhibition strengths of 10 or less, and at least one of deactivation of a catalyst, removal of a product having a low boiling point and addition of additives is performed in the extruder.

8. A production system for producing an aromatic polycarbonate by melt-polycondensing an aromatic dihydroxy compound and a carbonic acid diester in the presence of a catalyst continuously, the system comprising:
   a plurality of polycondensation vessels connected to each other in series,
   an extrusion die connected to the lowest downstream polycondensation vessel via a polymer filter, and
   pipes between all the polycondensation vessels and between the lowest downstream polycondensation vessel and the extrusion die,
   wherein all the pipes except for one between first and second upstream polycondensation vessels have a self-lubricating gear pump and also have valves, bends and detecting probes such that a total of flow inhibition strengths become 10 or less,
   provided that flow inhibition strength per valve or bend is 1 and flow inhibition strength per detecting probe is 0.5.

9. The system of claim 8, wherein the plurality of polycondensation vessels are 2 to 7 polycondensation vessels.

10. The system of claim 9, wherein a total of lengths of the pipes excluding the pipe between the first and second upstream polycondensation vessels is not longer than 100 m.

11. The system of claim 9, wherein a total of lengths of the pipes is not longer than 100 m.

12. The system of claim 8, wherein the pipe between the first and second upstream polycondensation vessels has a self-lubricating gear pump and also has valves, bends and detecting probes such that a total of flow inhibition strengths become 15 or less.

13. The system of claim 8, wherein a radius of curvature of a bend of each of the pipes is not less than five times as large as an internal diameter of the pipe.

14. The system of claim 8, wherein a total number of the valves is not larger than 30.

15. The system of claim 8, wherein the pipes also have 100 flanges or less in total.

16. The system of claim 8, wherein a total of flow inhibition strengths of the pipes is 55 or less.

17. A production system for producing an aromatic polycarbonate by melt-polycondensing an aromatic dihydroxy compound and a carbonic acid diester in the presence of a catalyst continuously, the system comprising:
   a plurality of polycondensation vessels connected to each other in series,
   an extruder connected to the lowest downstream polycondensation vessel,
   an extrusion die connected to the extruder via a polymer filter, and
   pipes between all the polycondensation vessels, between the lowest downstream polycondensation vessel and the extruder and between the extruder and the extrusion die,
   wherein all the pipes except for one between first and second upstream polycondensation vessels have a self-lubricating gear pump and also have valves, bends and detecting probes such that a total of flow inhibition strengths become 10 or less,
   provided that flow inhibition strength per valve or bend is 1 and flow inhibition strength per detecting probe is 0.5.

18. A production system for producing an aromatic polycarbonate, the system comprising:
   an extruder,
   an extrusion die, and
   a pipe which connects the extruder and the extrusion die with each other via a polymer filter and has valves, bends and detecting probes such that a total of flow inhibition strengths become 10 or less,
   provided that flow inhibition strength per valve or bend is 1 and flow inhibition strength per detecting probe is 0.5.

19. The system of claim 18, wherein the pipe also has a self-lubricating gear pump.

20. The system of claim 18, wherein the aromatic polycarbonate is one obtained by melt-polycondensing an aromatic dihydroxy compound and a carbonic acid diester in the presence of a catalyst.

* * * * *